United States Patent
Ochiai et al.

(10) Patent No.: US 9,920,969 B2
(45) Date of Patent: Mar. 20, 2018

(54) OIL LEVEL DETECTION DEVICE, AND REFRIGERATING AND AIR-CONDITIONING APPARATUS HAVING MOUNTED THEREON THE OIL LEVEL DETECTION DEVICE

(71) Applicant: Mitsubishi Electric Corporation, Tokyo (JP)

(72) Inventors: Yasutaka Ochiai, Tokyo (JP); Fumitake Unezaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 213 days.

(21) Appl. No.: 14/912,462

(22) PCT Filed: Sep. 9, 2014

(86) PCT No.: PCT/JP2014/073830
§ 371 (c)(1),
(2) Date: Feb. 17, 2016

(87) PCT Pub. No.: WO2015/045854
PCT Pub. Date: Apr. 2, 2015

(65) Prior Publication Data
US 2016/0201964 A1    Jul. 14, 2016

(30) Foreign Application Priority Data
Sep. 27, 2013  (WO) .................. PCT/JP2013/076405

(51) Int. Cl.
*F25B 43/02*     (2006.01)
*G01K 13/00*    (2006.01)
(Continued)

(52) U.S. Cl.
CPC ............ *F25B 49/022* (2013.01); *F25B 13/00* (2013.01); *F25B 31/002* (2013.01); *F25B 49/02* (2013.01);
(Continued)

(58) Field of Classification Search
CPC .... F25B 13/00; F25B 2700/03; F25B 31/002; F25B 49/022
(Continued)

(56) References Cited

FOREIGN PATENT DOCUMENTS

JP    S58-221351 A    12/1983
JP    2001-12351 A     1/2001
(Continued)

OTHER PUBLICATIONS

Office Action dated Mar. 28, 2017 issued in corresponding JP patent application No. 2015-539084 (and English translation).
Extended European Search Report dated Apr. 13, 2017 issued in corresponding EP patent application No. 14848892.7.
Office Action dated Feb. 28, 2017 issued in corresponding CN patent application No. 201480052909.X (and English translation).
Office Action dated Aug. 16, 2016 issued in corresponding JP patent application No. 2015-539084 (and English translation).
(Continued)

*Primary Examiner* — Henry Crenshaw
(74) *Attorney, Agent, or Firm* — Posz Law Group, PLC

(57) ABSTRACT

Provided is an oil level detection device to be mounted on a refrigerating and air-conditioning apparatus, the oil level detection device being configured to detect an oil level of oil accumulated inside a compressor forming the refrigerating and air-conditioning apparatus. The oil level detection device includes an oil level detection unit installed on an outer surface of the compressor and configured to detect a temperature of an installation position, a sensor output unit configured to output, to the refrigerating and air-conditioning apparatus, a signal for changing an operation state of the refrigerating and air-conditioning apparatus, and a determination unit configured to determine depletion of the oil accumulated inside the compressor based on measurement values obtained by the oil level detection unit at least after an output of the signal to be output from the sensor output unit.

11 Claims, 11 Drawing Sheets

(51) Int. Cl.
  *F25B 31/00*    (2006.01)
  *F25B 49/02*    (2006.01)
  *F25B 13/00*    (2006.01)

(52) U.S. Cl.
  CPC ............... *F25B 2313/0314* (2013.01); *F25B 2313/0315* (2013.01); *F25B 2600/021* (2013.01); *F25B 2600/024* (2013.01); *F25B 2700/03* (2013.01); *F25B 2700/1931* (2013.01); *F25B 2700/2104* (2013.01); *F25B 2700/2105* (2013.01); *F25B 2700/21151* (2013.01); *F25B 2700/21155* (2013.01); *Y02B 30/741* (2013.01)

(58) Field of Classification Search
  USPC .................................... 62/84, 129, 193, 468
  See application file for complete search history.

(56) References Cited

FOREIGN PATENT DOCUMENTS

| | | |
|---|---|---|
| JP | 2001-032772 A | 2/2001 |
| JP | 2006-029160 A | 2/2006 |
| JP | 2006-105061 A | 4/2006 |
| JP | 2006-112236 A | 4/2006 |
| WO | 2002/064979 A1 | 8/2002 |

OTHER PUBLICATIONS

International Search Report of the International Searching Authority dated Nov. 25, 2014 for the corresponding International application No. PCT/JP2014/073830 (and English translation).

OIL LEVEL DETECTION DEVICE, AND REFRIGERATING AND AIR-CONDITIONING APPARATUS HAVING MOUNTED THEREON THE OIL LEVEL DETECTION DEVICE

CROSS REFERENCE TO RELATED APPLICATIONS

This application is a U.S. national stage application of International Application No. PCT/JP2014/073830, filed on Sep. 9, 2014, and is based on International Application No. PCT/JP2013/076405, filed on Sep. 27, 2013, the contents of which are incorporated herein by reference.

TECHNICAL FIELD

The present invention relates to an oil level detection device configured to detect an oil level of a compressor of a refrigerating and air-conditioning apparatus, and to a refrigerating and air-conditioning apparatus having mounted thereon the oil level detection device.

BACKGROUND

Hitherto, there has been known an oil level detection device in which an oil level detection sensor formed of a thermistor is installed inside a compressor. The oil level detection device is configured to cause the oil level detection sensor to self-heat, to thereby detect the presence/absence of oil at an installation position of the oil level detection sensor based on the difference in heat transfer characteristics in a gas and in a liquid (see, for example, Patent Literature 1).

PATENT LITERATURE

Patent Literature 1: Japanese Examined Patent Application Publication No. 03-033994 (Page 8, FIG. 3, etc.)

However, considering the reliability and maintenance of the oil level detection sensor, it is difficult to actually install the oil level detection sensor inside the compressor. This is because the temperature and pressure change significantly inside the compressor and oil and gas refrigerant circulate at high speed therein, which is a severe condition for the installation environment of the oil level detection sensor. Further, when the oil level detection sensor goes out of order, it is necessary to replace the whole compressor, which causes cost and labor for maintenance. Therefore, it is preferred that the oil level detection sensor be installed outside the compressor. However, in the case where the oil level detection sensor is installed outside the compressor, the following problems occur.

Specifically, in the case where the oil level detection sensor is installed inside the compressor, the difference in heat transfer characteristics in oil and in gas refrigerant appears as the difference of detection temperature equal to or more than tens of degrees C. Meanwhile, in the case where the oil level detection sensor is installed outside the compressor, the difference in temperature between an oil portion and a gas portion appearing on an outer surface of the compressor is only several degrees C. Then, the oil level detection sensor is liable to be influenced by a change in operation state of the compressor and a change in environment state of the compressor (such as an outside air temperature), and even in a state in which oil is depleted, the oil level detection sensor may erroneously detect that oil is present, depending on the temperature condition of oil and gas refrigerant inside the compressor.

SUMMARY

The present invention has been made in view of the above-mentioned circumstances, and an object of the present invention is to provide an oil level detection device capable of correctly detecting depletion of oil with an installed oil level detection sensor, and to provide a refrigerating and air-conditioning apparatus having mounted thereon the oil level detection device.

According to one embodiment of the present invention, there is provided an oil level detection device to be mounted on a refrigerating and air-conditioning apparatus, the oil level detection device being configured to detect an oil level of oil accumulated inside a compressor of the refrigerating and air-conditioning apparatus, the oil level detection device comprising: an oil level detection sensor installed at a position at a predetermined height of the compressor and configured to detect a temperature of the position of installation of the oil level detection device; an output unit configured to output, to the refrigerating and air-conditioning apparatus, a signal to change a compressor suction temperature of refrigerant to be sucked into the compressor; and a determination unit configured to determine whether there is depletion of the oil accumulated inside the compressor by comparing a measurement value obtained by the oil level detection sensor before an output of the signal from the output unit, with a measurement value obtained by the oil level detection sensor after the output of the signal from the output unit.

According to the one embodiment of the present invention, it is possible to obtain the oil level detection device capable of correctly detecting depletion of oil with the installed oil level detection sensor.

DETAILED DESCRIPTION

Embodiment 1

Figure 1:
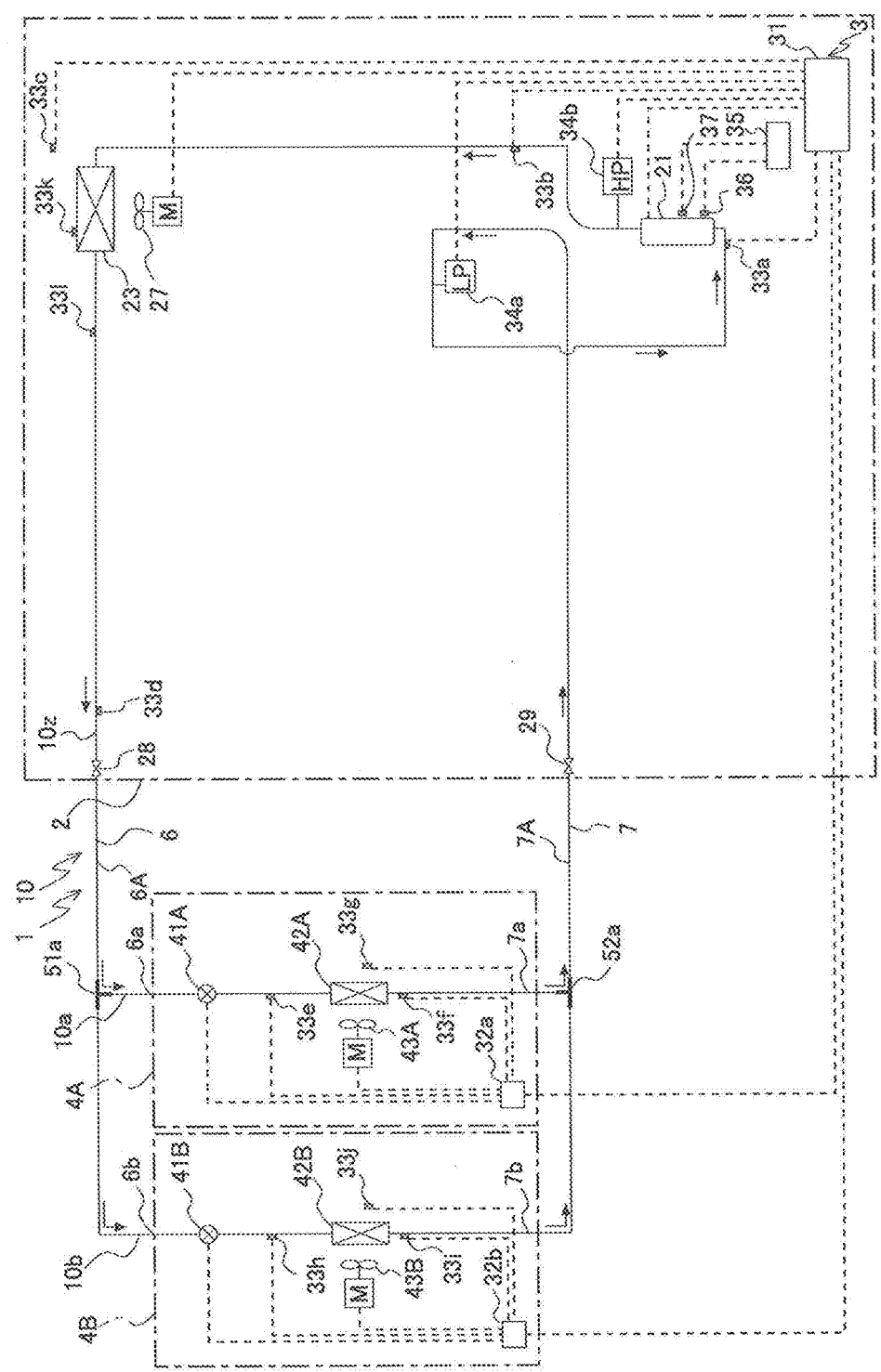
FIG. 1 is a schematic configuration diagram for illustrating an example of a refrigerant circuit configuration of a refrigerating and air-conditioning apparatus 1 according to Embodiment 1 to Embodiment 3 of the present invention.

FIG. 1 is a schematic configuration diagram for illustrating an example of a refrigerant circuit configuration of a refrigerating and air-conditioning apparatus 1 according to Embodiment 1 to Embodiment 3 of the present invention. The refrigerant circuit configuration and operation of the refrigerating and air-conditioning apparatus 1 are described with reference to FIG. 1. The refrigerating and air-conditioning apparatus 1 is installed in, for example, a building or a condominium and performs a vapor-compression refrigeration cycle operation, to thereby be used for cooling and heating of an air-conditioning target region in which the refrigerating and air-conditioning apparatus 1 is installed. Note that, in the following figures including FIG. 1, the size relation of each constituent member may be different from an actual relation.

(Configuration of Refrigerating and Air-Conditioning Device 1)

The refrigerating and air-conditioning apparatus 1 mainly includes an outdoor unit 2 serving as a heat source unit, and an indoor unit 4 (an indoor unit 4A, an indoor unit 4B) serving as a plurality of use units (two units are illustrated in FIG. 1) connected in parallel with each other to the outdoor unit. Further, the refrigerating and air-conditioning apparatus 1 includes an extension pipe (a liquid extension pipe (a second extension pipe) 6, a gas extension pipe (a first extension pipe) 7) configured to connect the outdoor unit 2 and the indoor unit 4 to each other. That is, the refrigerating and air-conditioning apparatus 1 includes a refrigerant circuit 10 in which the outdoor unit 2 and the indoor unit 4 are connected to each other through a refrigerant pipe to circulate refrigerant. Note that, the liquid extension pipe 6 includes a main liquid extension pipe 6A, a branched liquid extension pipe 6a, a branched liquid extension pipe 6b, and a distributor 51a. Further, the gas extension pipe 7 includes a main gas extension pipe 7A, a branched gas extension pipe 7a, a branched gas extension pipe 7b, and a distributor 52a. As the refrigerant, R410A is used herein.

[Indoor Unit 4]

The indoor unit 4A and the indoor unit 4B each receive the supply of cooling energy or heating energy from the outdoor unit 2 to supply cooling air or heating air to the air-conditioning target region. Note that, in the following description, suffixes "A" and "B" of the indoor unit 4 may be omitted, and in this case, the indoor unit 4 is intended to refer to both the indoor unit 4A and the indoor unit 4B. Further, in the illustration, "A (or a)" is added to a reference symbol of each device (including a part of the circuit) of the "indoor unit 4A" system, and "B (or b)" is added to a reference symbol of each device (including a part of the circuit) of the "indoor unit 4B" system. In the descriptions thereof, suffixes "A (or a)" and "B (or b)" of each reference symbol may be omitted, and needless to say, this case refers to both devices.

The indoor unit 4 is installed by being embedded in an indoor ceiling of a building or the like, suspended therefrom, hung on an indoor wall surface, or other methods. The indoor unit 4A is connected from the outdoor unit 2 through the main liquid extension pipe 6A, the distributor 51a, the branched liquid extension pipe 6a, the branched gas extension pipe 7a, the distributor 52a, and the main gas extension pipe 7A, to thereby form a part of the refrigerant circuit 10. The indoor unit 4B is connected from the indoor unit 2 through the main liquid extension pipe 6A, the distributor 51a, the branched liquid extension pipe 6b, the branched gas extension pipe 7b, the distributor 52a, and the main gas extension pipe 7A, to thereby form a part of the refrigerant circuit 10.

The indoor unit 4 mainly includes an indoor-side refrigerant circuit (an indoor-side refrigerant circuit 10a, an indoor-side refrigerant circuit 10b) forming a part of the refrigerant circuit 10. The indoor-side refrigerant circuit mainly includes an expansion valve 41 serving as an expansion mechanism and an indoor heat exchanger 42 serving as a use-side heat exchanger, which are connected in series.

The indoor heat exchanger 42 exchanges heat between a heat medium (such as air or water) and refrigerant, to thereby condense and liquefy or evaporate and gasify the refrigerant. Specifically, the indoor heat exchanger 42 serves as a condenser (radiator) of the refrigerant to heat indoor air during a heating operation and serves as an evaporator of the refrigerant to cool indoor air during a cooling operation. There is no particular limitation on the type or form of the indoor heat exchanger 42, but the indoor heat exchanger 42 may be formed of, for example, a cross fin-type fin-and-tube heat exchanger including heat transfer tubes and a large number of fins.

The expansion valve 41 is installed on a liquid side of the indoor heat exchanger 42 for the purpose of, for example, controlling the flow rate of the refrigerant flowing through the indoor-side refrigerant circuit, and expands the refrigerant by reducing the pressure. The expansion valve 41 may be formed of a valve capable of variably controlling an opening degree, such as an electronic expansion valve.

The indoor unit 4 includes an indoor fan 43. The indoor fan 43 is a blower device configured to suck indoor air into the indoor unit 4 and subject the indoor air to heat exchange with the refrigerant in the indoor heat exchanger 42, and thereafter supply the resultant to the indoor as supply air. The indoor fan 43 may be formed of a fan capable of varying the volume of the air supplied to the indoor heat exchanger 42, such as a centrifugal fan or a multi-blade fan driven by a DC fan motor. Note that, the indoor heat exchanger 42 may be formed of a heat exchanger configured to perform heat exchange between the refrigerant and a heat medium (such as water or brine) different from air.

Further, various sensors are provided in the indoor unit 4. A gas-side temperature sensor or gas-side temperature sensors (a gas-side temperature sensor 33f (mounted on the indoor unit 4A), a gas-side temperature sensor 33i (mounted on the indoor unit 4B)) configured to detect the temperature of the refrigerant (that is, the refrigerant temperature corresponding to a condensing temperature Tc during the heating operation or an evaporating temperature Te during the cooling operation) is/are provided on a gas side of the indoor heat exchanger 42. A liquid-side temperature sensor or liquid-side temperature sensors (a liquid-side temperature sensor 33e (mounted on the indoor unit 4A), a liquid-side temperature sensor 33h (mounted on the indoor unit 4B)) configured to detect a temperature Teo of the refrigerant is/are provided on a liquid side of the indoor heat exchanger 42.

Further, an indoor temperature sensor or indoor temperature sensors (an indoor temperature sensor 33g (mounted on the indoor unit 4A), an indoor temperature sensor 33j (mounted on the indoor unit 4B)) configured to detect the temperature of the indoor air flowing into the unit (that is, an indoor temperature Tr) is provided on a suction port side of the indoor air of the indoor unit 4. Information (temperature information) detected by those various sensors is sent to a control unit (an indoor-side control unit 32) described later configured to control the operation of each device mounted on the indoor unit 4 and used for controlling the operation of each device. Note that, there is no particular limitation on the kinds of the liquid-side temperature sensors 33e, 33h, the gas-side temperature sensors 33f, 33i, and the indoor temperature sensors 33g, 33j, but those sensors may be formed of, for example, thermistors.

Further, the indoor unit 4 includes an indoor-side control unit 32 (32a, 32b) configured to control the operation of each device forming the indoor unit 4. Then, the indoor-side control unit 32 includes a microcomputer, a memory, and the like provided so as to control the indoor unit 4. The indoor-side control unit 32 is adapted to be able to communicate a control signal or other signals with a remote controller (not shown) configured to operate the indoor unit 4 individually and to communicate a control signal or other signals with the outdoor unit 2 (specifically, an outdoor-side control unit 31) through a transmission line (or wirelessly). That is, the indoor-side control unit 32 serves as a control unit 3 configured to perform the operation control of the entire refrigerating and air-conditioning apparatus 1 by cooperating with the outdoor-side control unit 31 (see FIG. 3).

[Outdoor Unit 2]

The outdoor unit 2 serves to supply cooling energy or heating energy to the indoor unit 4. The outdoor unit 2 is installed outside of, for example, a building. The outdoor unit 2 is connected from the indoor unit 4 to be connected thereto through the liquid extension pipe 6 and the gas extension pipe 7, to thereby form a part of the refrigerant circuit 10. That is, the refrigerant flowing out of the outdoor unit 2 to flow through the main liquid extension pipe 6A is branched into the branched liquid extension pipe 6a and the branched liquid extension pipe 6b via the distributor 51a to flow into each of the indoor unit 4A and the indoor unit 4B. Similarly, the refrigerant flowing out of the outdoor unit 2 to flow through the main gas extension pipe 7A is branched into the branched gas extension pipe 7a and the branched gas extension pipe 7b via the distributor 52a to flow into each of the indoor unit 4A and the indoor unit 4B.

The outdoor unit 2 mainly includes an outdoor-side refrigerant circuit 10z forming a part of the refrigerant circuit 10. The outdoor-side refrigerant circuit 10z mainly includes a compressor 21, an outdoor heat exchanger 23 serving as a heat source-side heat exchanger, a liquid-side stop valve 28, and a gas-side stop valve 29, which are connected in series.

The compressor 21 sucks the refrigerant and compresses the refrigerant into a state of high temperature and high pressure. The compressor 21 is briefly described with reference to FIG. 2 below.

Figure 2:
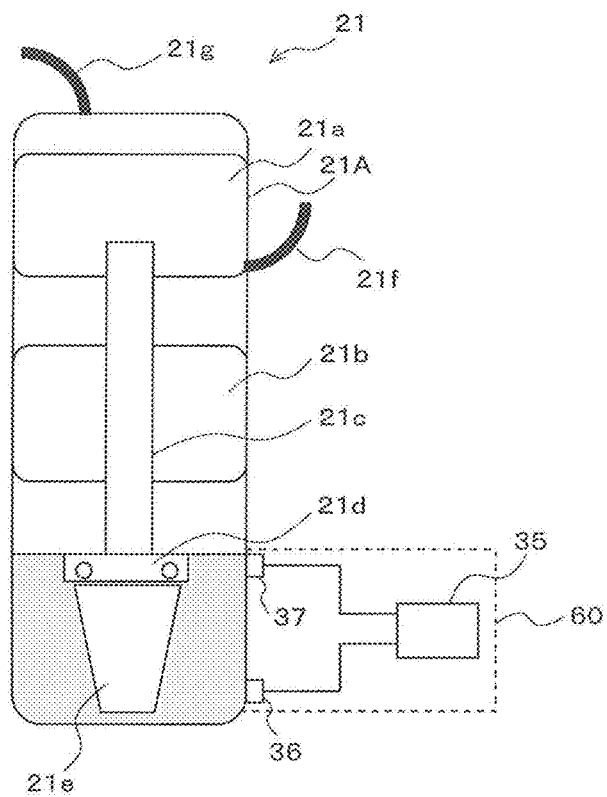
FIG. 2 is a view for illustrating a configuration of a compressor of FIG. 1.

FIG. 2 is a view for illustrating a configuration of the compressor of FIG. 1.

The compressor 21 includes a compression unit 21a configured to suck the refrigerant from outside to compress the refrigerant, an electric unit 21b including a stator and a rotator, and a main shaft 21c configured to connect the compression unit 21a and the electric unit 21b to each other to transmit rotating force generated by the electric unit 21b to the compression unit 21a. The compressor 21 is configured such that those components are accommodated in a sealed container 21A. The main shaft 21c is arranged so as to extend in a vertical direction in the sealed container 21A and is pivotally supported by a bearing unit 21d. Further, an oil pump 21e is provided at a lower end of the main shaft 21c, and pumps up oil accumulated in a lower portion of the sealed container 21A to supply the oil to each sliding portion of the main shaft 21c and the compression unit 21a.

Further, a suction pipe 21f configured to suck the refrigerant is provided on a side surface of the sealed container 21A, and a discharge pipe 21g configured to discharge the compressed refrigerant is provided on an upper surface of the sealed container 21A.

The compressor 21 may be formed of a compressor capable of varying the operating capacity, such as a positive displacement compressor including the electric unit 21b configured to control a frequency F with an inverter. Note that, the case where one compressor 21 is arranged is illustrated as an example in FIG. 1, but two or more compressors 21 may be extended to be mounted in parallel in accordance with the extended number of the indoor units 4 without being limited to the foregoing case.

An oil level detection device 60 configured to detect an oil level inside the compressor 21 is arranged on an outer surface of the compressor 21 thus configured. The detail of the oil level detection device 60 is described later.

Now, the description is returned to FIG. 1. The outdoor heat exchanger 23 serves as a condenser (radiator) of the refrigerant, and exchanges heat between the heat medium (such as air or water) and the refrigerant, to thereby condense and liquefy the refrigerant. There is no particular limitation on the type or form of the outdoor heat exchanger 23, but the outdoor heat exchanger 23 may be formed of, for example, a cross fin-type fin-and-tube heat exchanger including heat transfer tubes and a large number of fins. Note that, a gas side of the outdoor heat exchanger 23 is connected to the compressor 21, and a liquid side thereof is connected to the main liquid extension pipe 6A.

The outdoor unit 2 includes an outdoor fan 27. The outdoor fan 27 is a blower device configured to suck outdoor air into the outdoor unit 2 and subject the outdoor air to heat exchange with the refrigerant in the outdoor heat exchanger 23, and thereafter discharge the resultant air to the outdoor. This outdoor fan 27 may be formed of a fan capable of varying the volume of the air supplied to the outdoor heat exchanger 23, such as a propeller fan driven by a motor formed of a DC fan motor. Note that, the outdoor heat exchanger 23 may be formed of a heat exchanger configured to perform heat exchange between the refrigerant and the heat medium (such as water or brine) different from air.

Further, a plurality of pressure sensors and temperature sensors are provided in the outdoor unit 2. As the pressure sensors, a suction pressure sensor 34a configured to detect a suction pressure Ps of the compressor 21 and a discharge pressure sensor 34b configured to detect a discharge pressure Pd of the compressor 21 are installed.

As the temperature sensors, a suction temperature sensor 33a, a discharge temperature sensor 33b, a liquid pipe temperature sensor 33d, a heat exchange temperature sensor 33k, a liquid-side temperature sensor 33l, and an outdoor temperature sensor 33c are installed in the outdoor unit 2. The suction temperature sensor 33a is provided at a position between an accumulator 24 and the compressor 21, and detects a suction temperature Ts of the compressor 21. The discharge temperature sensor 33b detects a discharge temperature Td of the compressor 21. The heat exchange temperature sensor 33k detects the temperature of the refrigerant flowing through the outdoor heat exchanger 23. The liquid-side temperature sensor 33l is installed on a liquid side of the outdoor heat exchanger 23, and detects the temperature of the refrigerant on the liquid side. The outdoor temperature sensor 33c is installed on a suction port side of the outdoor air of the outdoor unit 2, and detects the temperature of the outdoor air flowing into the outdoor unit 2.

Information (temperature information) detected by those various sensors is sent to a control unit (an outdoor-side control unit 31) configured to control the operation of each device mounted on the indoor unit 4 and used for controlling the operation of each device. Note that, there is no particular limitation on the kinds of the temperature sensors, but those sensors may be formed of, for example, thermistors.

Further, the outdoor unit 2 includes an outdoor-side control unit 31 configured to control the operation of each element of the outdoor unit 2. The outdoor-side control unit 31 includes a microcomputer, a memory, an inverter circuit configured to control the motor, and the like provided so as to control the outdoor unit 2. The outdoor-side control unit 31 is adapted to be able to communicate a control signal or other signals with the indoor-side control unit 32 of the indoor unit 4 through a transmission line (or wirelessly). That is, the outdoor-side control unit 31 serves as the control unit 3 configured to perform the operation control of the entire refrigerating and air-conditioning apparatus 1 by cooperating with the indoor-side control unit 32 (see FIG. 3).

Figure 3:
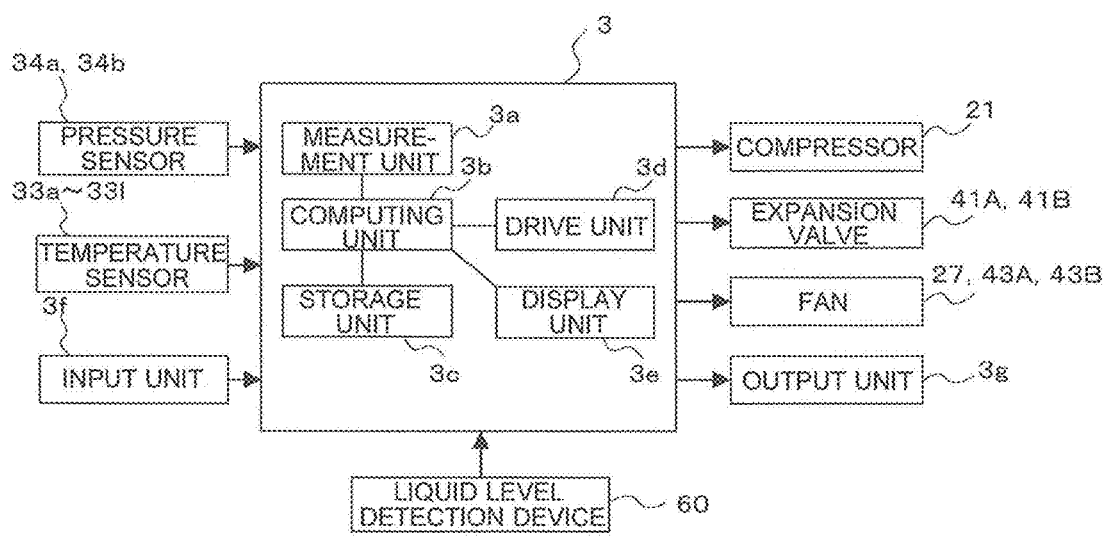
FIG. 3 is a control block diagram for illustrating an electrical configuration of the refrigerating and air-conditioning apparatus 1 of FIG. 1.

Now, the control unit 3 is described in detail. FIG. 3 is a control block diagram for illustrating an electrical configuration of the refrigerating and air-conditioning apparatus 1 of FIG. 1.

The control unit 3 is connected to the following sensors (detection units): the pressure sensors (the suction pressure sensor 34a, the discharge pressure sensor 34b); and the temperature sensors (the gas-side temperature sensors 33f, 33i, the liquid-side temperature sensors 33e, 33h, the indoor temperature sensors 33g, 33j, the suction temperature sensor 33a, the discharge temperature sensor 33b, the outdoor temperature sensor 33c, the liquid pipe temperature sensor 33d, the heat exchange temperature sensor 33k, the liquid-side temperature sensor 33l) so as to be capable of receiving detection signals therefrom. Further, the control unit 3 is connected to various devices (the compressor 21, the outdoor fan 27, the indoor fan 43, the expansion valve 41 serving as a flow control valve) so as to be capable of controlling the various devices based on the detection signals of those sensors or other signals.

As illustrated in FIG. 3, the control unit 3 includes a measurement unit 3a, a computing unit 3b, a storage unit 3c, a drive unit 3d, a display unit 3e, an input unit 3f, and an output unit 3g. The measurement unit 3a serves to measure a pressure and a temperature (that is, the operation state amount) of the refrigerant circulating through the refrigerant circuit 10 based on the information sent from the pressure sensors and the temperature sensors. The computing unit 3b serves to compute a refrigerant amount (that is, the operation state amount) based on the measurement value measured by the measurement unit 3a. The storage unit 3c serves to accumulate the measurement value measured by the measurement unit 3a and the refrigerant amount computed and calculated by the computing unit 3b and to accumulate information from outside.

The drive unit 3d serves to control driving of each element (specifically, a compressor motor, a valve mechanism, a fan motor, etc.) configured to drive the refrigerating and air-conditioning apparatus 1. The display unit 3e serves to report abnormality caused by operating the refrigerating and air-conditioning apparatus 1 with a sound or a display and to report an oil level detection result (determination result regarding whether the oil is depleted or not) of the oil level detection device 60 with a sound or a display. The input unit 3f serves to input or change setting values for various controls and to input outside information such as a refrigerant filling amount. The output unit 3g serves to output the measurement value measured by the measurement unit 3a and the value computed by the computing unit 3b to outside.

(Extension Pipe)

The extension pipe (the liquid extension pipe 6, the gas extension pipe 7) connects the outdoor unit 2 and the indoor unit 4 to each other so that the refrigerant circulates through the refrigerating and air-conditioning apparatus 1. That is, the refrigerating and air-conditioning apparatus 1 includes the refrigerant circuit 10 formed by extensively connecting various devices forming the refrigerating and air-conditioning apparatus 1 with the extension pipe and causes the refrigerant to circulate through the refrigerant circuit 10, to thereby be able to perform the cooling operation and the heating operation.

As described above, the extension pipe includes the liquid extension pipe 6 (the main liquid extension pipe 6A, the branched liquid extension pipe 6a, the branched liquid extension pipe 6b, and the distributor 51a) through which liquid refrigerant or two-phase refrigerant flows, and the gas extension pipe 7 (the main gas extension pipe 7A, the branched gas extension pipe 7a, the branched gas extension pipe 7b, and the distributor 52a) through which gas refrigerant flows. Of those, the main liquid extension pipe 6A, the branched liquid extension pipe 6a, the branched liquid extension pipe 6b, the main gas extension pipe 7A, the branched gas extension pipe 7a, and the branched gas extension pipe 7b are refrigerant pipes to be constructed on site when the refrigerating and air-conditioning apparatus 1 is installed at an installation position, such as a building. As each of the pipes, a pipe having a pipe diameter determined in accordance with the combination of the outdoor unit 2 and the indoor unit 4 is used.

Note that, in Embodiment 1, the extension pipe having added thereto the distributor 51a and the distributor 52a is used for connecting one outdoor unit 2 and two indoor units 4 to each other, but the distributor 51a and the distributor 52a are not necessarily required. Further, the shapes of the distributor 51a and the distributor 52a may be determined in accordance with the extended number of the indoor units 4. For example, as illustrated in FIG. 1, the distributor 51a and the distributor 52a may be each formed of a T-pipe or may be configured through use of a header.

Further, in the case where a plurality of (three or more) indoor units 4 are connected, the refrigerant may be distributed through use of a plurality of T-pipes or may be distributed through use of a header.

(Oil Level Detection Device)

Figure 4:
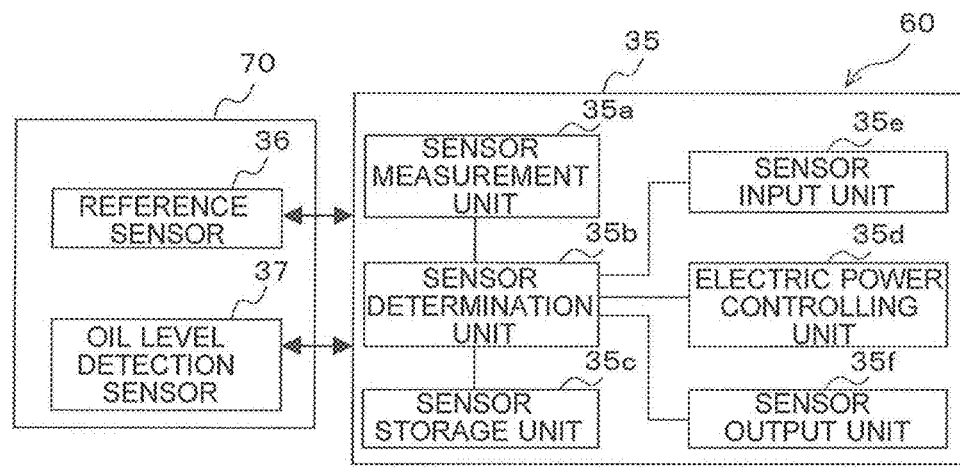
FIG. 4 is a block diagram for illustrating a configuration of an oil level detection device according to Embodiment 1 of the present invention.

FIG. 4 is a block diagram for illustrating a configuration of the oil level detection device according to Embodiment 1 of the present invention.

The oil level detection device 60 includes an oil level detection unit 70 including a reference sensor 36 and an oil level detection sensor 37, and a sensor control unit 35 configured to control the electric power supplied to each of the reference sensor 36 and the oil level detection sensor 37 and measure a measurement value of each of the sensors 36 and 37. The oil level detection device 60 is installed on the outer surface of the compressor 21 as illustrated in FIG. 2 and detects whether or not an oil level (amount) inside the compressor is a proper amount (that is, whether or not the oil is depleted). The proper amount of oil varies depending on the compressor, and in Embodiment 1, as illustrated in FIG. 2, the amount of the oil accumulated enough to reach the bearing unit 21d is defined as the proper amount.

The reference sensor 36 is installed on the outer surface of the compressor at a height that is constantly filled with the oil, and measures a temperature at the installation position to send the measurement value to a sensor measurement unit described later. Further, the oil level detection sensor 37 is installed on the outer surface of the compressor at a height requiring oil level management (height at which the oil amount is desired to be ensured, for example, height opposing the bearing unit 21d), and measures a temperature of the installation position to send the measurement value to a sensor measurement unit 35a described later. The determination result in the installation state is as follows. When an oil level is at a height at which the oil level detection sensor 37 is installed, it is determined that the proper amount of oil is present, and the determination result is defined as "oil present". When an oil level is at a height lower than the oil level detection sensor 37, it is determined that the proper amount of oil is absent, and the determination result is defined as "oil depletion".

As the reference sensor 36 and the oil level detection sensor 37, a thermistor in which a resistance changes linearly depending on the temperature is used. Through a change in electric power to be applied to the thermistor, the thermistor can serve as two types of detection systems: a type involving measuring a temperature without self-heating (temperature detection type, described later) and a type involving externally heating the outer surface of the compressor by self-heating and measuring heat transfer characteristics (external heating type, described later). Through use of the thermistor, heating and temperature sensing can be performed with one component. Note that, the reference sensor 36 and the oil level detection sensor 37 are each configured to perform heating and temperature sensing with one component (thermistor), but the present invention is not limited thereto. For example, a heating body and a temperature measurement element may be provided separately. In this case, as the heating body, for example, a heater can be used.

As illustrated in FIG. 4, the sensor control unit 35 includes the sensor measurement unit 35a, a sensor determination unit 35b, a sensor storage unit 35c, an electric power controlling unit 35d, a sensor input unit 35e, and a sensor output unit 35f.

The sensor measurement unit 35a serves to measure a temperature based on the measurement values sent from the reference sensor 36 and the oil level detection sensor 37. The sensor determination unit 35b is a unit configured to control the electric power controlling unit 35d and the sensor output unit 35f and determine whether or not the oil is depleted based on the sensor information obtained by the sensor measurement unit 35a. The sensor storage unit 35c is a unit configured to accumulate the information obtained by the sensor measurement unit 35a and the sensor determination unit 35b.

The electric power controlling unit 35d is a unit configured to control the electric power supplied to the reference sensor 36 and the oil level detection sensor 37 based on the information of the sensor determination unit 35b. Specifically, the electric power controlling unit 35d performs first electric power control of supplying first electric power, which does not cause the reference sensor 36 and the oil level detection sensor 37 to self-heat, to the reference sensor 36 and the oil level detection sensor 37 and, second electric power control of supplying second electric power, which causes the reference sensor 36 and the oil level detection sensor 37 to self-heat, to the reference sensor 36 and the oil level detection sensor 37.

The sensor input unit 35e is a unit configured to obtain a signal for an oil level detection start and obtain information required for determination of the sensor determination unit 35b. The sensor output unit 35f is a unit configured to output the determination result determined by the sensor determination unit 35b for an external alarm and output a signal to change the operation state of the refrigerating and air-conditioning apparatus 1 to the refrigerating and air-conditioning apparatus 1. The data output from the sensor output unit 35f is input to the control unit 3 of the refrigerating and air-conditioning apparatus 1 and processed appropriately on the refrigerating and air-conditioning apparatus 1. Note that, a display unit such as a liquid crystal panel may be provided in the oil level detection device 60 so that the determination result is displayed on the oil level detection device 60 side.

(Operation of Refrigerating and Air-Conditioning Device 1)

The operation of each element of the refrigerating and air-conditioning apparatus 1 is described. The refrigerating and air-conditioning apparatus 1 controls each device forming the refrigerating and air-conditioning apparatus 1 in accordance with an operation load of each indoor unit 4, to thereby perform the cooling operation.

Figure 5:
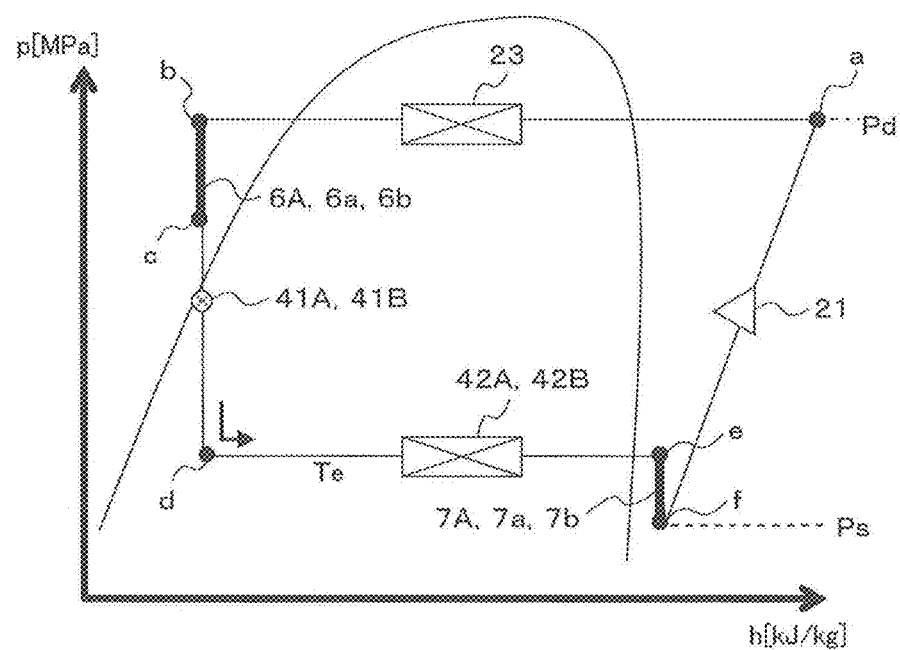
FIG. 5 is a p-h diagram during a cooling operation of the refrigerating and air-conditioning apparatus according to Embodiment 1 of the present invention.

FIG. 5 is a p-h diagram during the cooling operation of the refrigerating and air-conditioning apparatus according to Embodiment 1 of the present invention. Note that, in FIG. 1, the flow of the refrigerant during the cooling operation is indicated by the solid arrow. Further, in the refrigerating and air-conditioning apparatus 1, refrigerant leakage detection is constantly conducted so that remote monitoring can be performed with a management center or the like through use of a communication line.

The cooling operation performed by the refrigerating and air-conditioning apparatus 1 is described with reference to FIG. 1 and FIG. 5.

During the cooling operation, a discharge side of the compressor 21 is connected to the gas side of the outdoor heat exchanger 23. Further, a suction side of the compressor 21 is connected to the gas side of the indoor heat exchanger 42 through the gas-side stop valve 29 and the gas extension pipe 7 (the main gas extension pipe 7A, the branched gas extension pipe 7a, the branched gas extension pipe 7b). Note that, the liquid-side stop valve 28 and the gas-side stop valve 29 are in an opened state. Further, the case where the cooling operation is performed in all the indoor units 4 is described as an example.

Refrigerant at low temperature and low pressure is compressed by the compressor 21 and discharged as gas refrigerant at high temperature and high pressure (point "a" illustrated in FIG. 5). The gas refrigerant at high temperature and high pressure discharged from the compressor 21 flows into the outdoor heat exchanger 23. The refrigerant flowing into the outdoor heat exchanger 23 is condensed and liquefied while transferring heat to the outdoor air due to the air-sending action of the outdoor fan 27 (point "b" illustrated in FIG. 5). The condensing temperature at this time is determined by subjecting the pressure detected by the heat exchange temperature sensor 33k or the discharge pressure sensor 34b to saturation temperature conversion.

Then, the high-pressure liquid refrigerant flowing out of the outdoor heat exchanger 23 flows out of the outdoor unit 2 through the liquid-side stop valve 28. The high-pressure liquid refrigerant flowing out of the outdoor unit 2 is decreased in pressure by pipe wall surface friction in the main liquid extension pipe 6A, the branched liquid extension pipe 6a, and the branched liquid extension pipe 6b (point "c" illustrated in FIG. 5). This refrigerant flows into the indoor unit 4 and is reduced in pressure by the expansion valve 41 to become a low-pressure two-phase gas-liquid refrigerant (point "d" illustrated in FIG. 5). The two-phase gas-liquid refrigerant flows into the indoor heat exchanger 42 serving as the evaporator of the refrigerant and is vaporized and gasified by removing heat from air due to the air-sending action of the indoor fan 43 (point "e" illustrated in FIG. 5). At this time, the cooling of the air-conditioning target region is performed.

The evaporating temperature at this time is measured by the liquid-side temperature sensor 33e and the liquid-side temperature sensor 33h. Then, a degree of superheat SH of the refrigerant at an outlet of the indoor heat exchanger 42A and the indoor heat exchanger 42B is determined by subtracting the refrigerant temperature detected by the liquid-side temperature sensor 33e and the liquid-side temperature sensor 33h from the refrigerant temperature value detected by the gas-side temperature sensor 33f and the gas-side temperature sensor 33i. That is, the temperature of the refrigerant can be measured as necessary by each of the temperature sensors in accordance with the operation state.

Further, during the cooling operation, the opening degree of the expansion valves 41A and 41B is controlled so that the degree of superheat SH of the refrigerant at the outlet of the indoor heat exchangers 42A and 41B (that is, on the gas side of the indoor heat exchanger 42A and the indoor heat exchanger 42B) reaches target value SHm of the a degree of superheat.

The gas refrigerant passing through the indoor heat exchanger 42 passes through the branched gas extension pipe 7a, the branched gas extension pipe 7b, and the main gas extension pipe 7A to flow into the outdoor unit 2 through the gas-side stop valve 29. Note that, the gas refrigerant is decreased in pressure by pipe wall surface friction at the time when passing through the branched gas extension pipe 7a, the branched gas extension pipe 7b, and the main gas extension pipe 7A (point "f" illustrated in FIG. 5). Then, the refrigerant flowing into the outdoor unit 2 is sucked again by the compressor 21 via the accumulator 24. Through the above-mentioned flow, the refrigerating and air-conditioning apparatus 1 performs the cooling operation.

A fluid inside the compressor is formed of oil and refrigerant. Gas refrigerant is discharged substantially in a sucked amount, and hence the gas refrigerant is not accumulated inside the compressor. In contrast, the discharge amount of oil is limited, and the amount of oil that is accumulated inside the compressor is larger than the amount of oil that circulates through the refrigerant circuit. The oil retained inside the compressor is pumped up by the oil pump 21e and supplied to the compression unit 21a and the electric unit 21b inside the compressor to be heated therein. Then, when the operation continues for a long period of time, the temperature of the oil inside the compressor increases.

(Oil Level Detection Principle)

In the oil level detection according to Embodiment 1, only the oil level detection sensor 37 is used. In the oil level detection according to Embodiment 1, the operation state of the refrigerating and air-conditioning apparatus 1 is put into a certain state A at time of the start of measurement, and temperature measurement is performed in the oil level detection sensor 37. Then, the operation state of the refrigerating and air-conditioning apparatus 1 is changed to another state B. The purpose of changing the operation state of the refrigerating and air-conditioning apparatus 1 into another state B is to change the temperature of the gas refrigerant flowing into the compressor 21 (hereinafter referred to as "compressor suction temperature"). When the compressor suction temperature is changed as described above, the temperature of the gas refrigerant inside the compressor 21 changes significantly. Therefore, in the case where the measurement value of the oil level detection sensor 37 changes, the gas refrigerant is present at the height position of the oil level detection sensor 37. In the oil level detection according to Embodiment 1, whether or not oil is depleted is determined through use of this principle.

Figure 6:
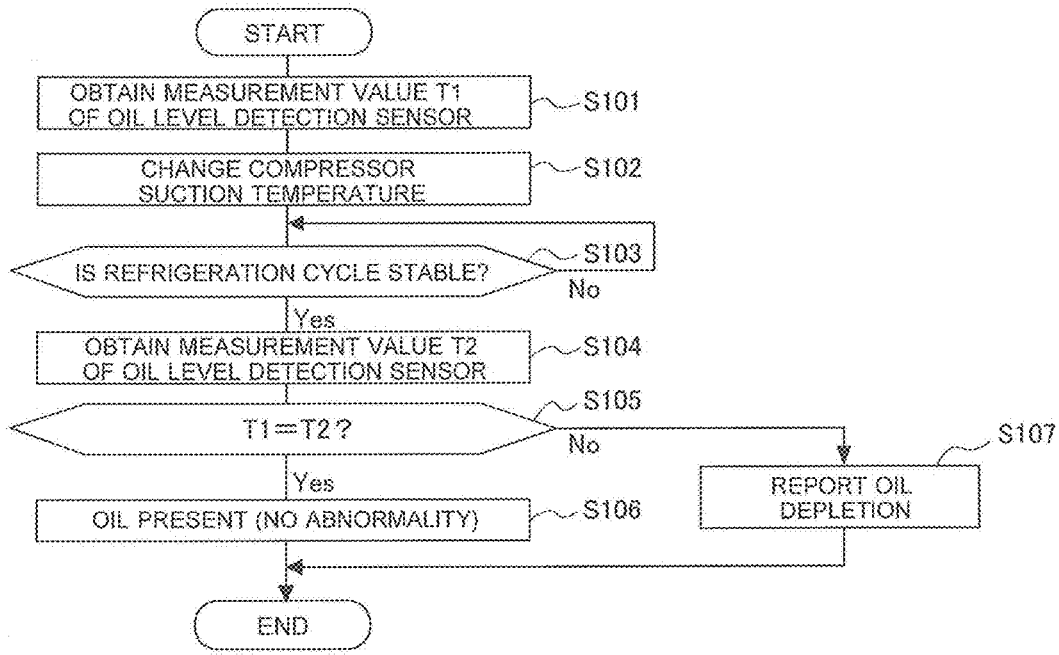
FIG. 6 is a flowchart for illustrating a flow of oil level detection in the oil level detection device according to Embodiment 1 of the present invention.

FIG. 6 is a flowchart (without self-heating) for illustrating a flow of the oil level detection of the oil level detection device according to Embodiment 1 of the present invention. Now, the specific flow of the oil level detection is described with reference to FIG. 6.

First, when the determination of the oil level detection is started, the sensor determination unit 35b causes the electric power controlling unit 35d to perform the first electric power control to obtain a measurement value T1 of the oil level detection sensor 37 (S101). Next, the sensor determination unit 35b causes the sensor output unit 35f to output a signal to change the compressor suction temperature to the refrigerating and air-conditioning apparatus 1, to thereby change the operation state of the refrigerating and air-conditioning apparatus (S102). Then, the sensor determination unit 35b determines whether or not the refrigeration cycle of the refrigerating and air-conditioning apparatus 1 is stable (S103). After confirming that the refrigeration cycle is stable, the sensor determination unit 35b obtains a measurement value T2 of the oil level detection sensor 37 (S104). After that, the sensor determination unit 35b compares T1 obtained in S101 and T2 obtained in S104 with each other (S105). When T1=T2, the sensor determination unit 35b determines "oil present (no abnormality)" (S106). When T1≠T2, the sensor determination unit 35b determines "oil depletion" and reports the determination (S107).

The flow of the liquid level detection in the case of using the oil level detection sensor 37 without causing the oil level detection sensor 37 to self-heat is described above, but in the case of the method involving using the oil level detection sensor 37 by causing the oil level detection sensor 37 to self-heat, the oil level detection is performed as follows.

Figure 7:
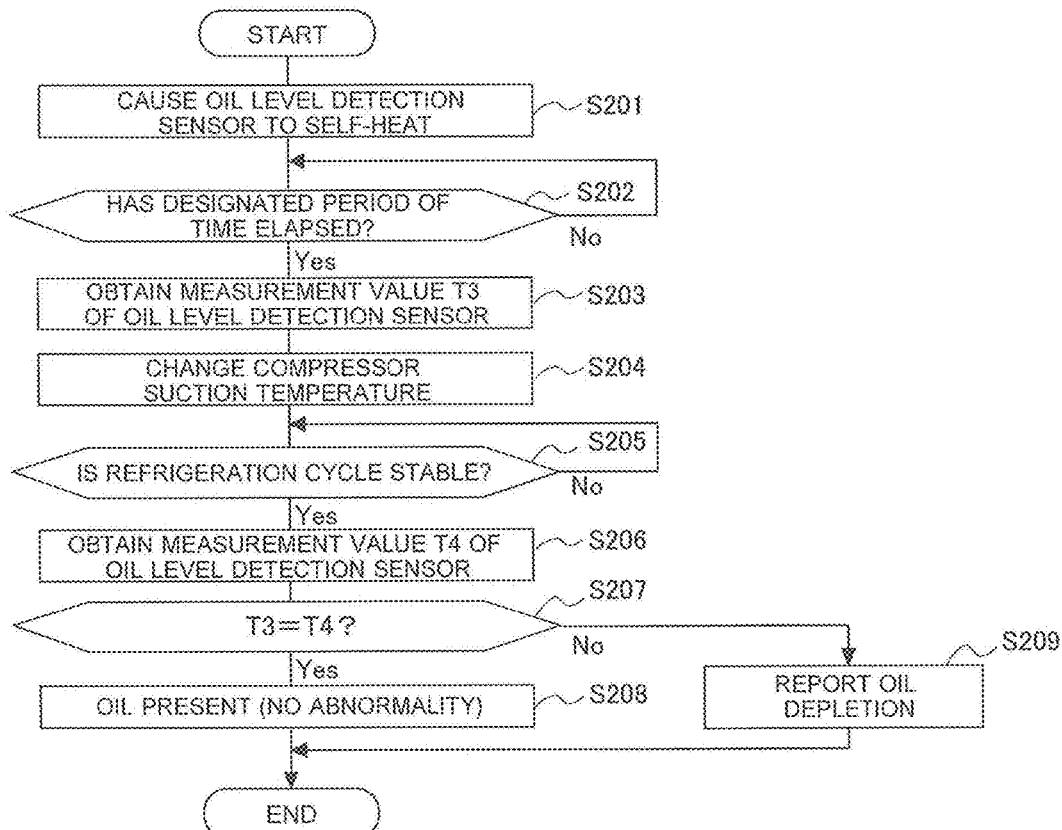
FIG. 7 is a flowchart for illustrating a flow of oil level detection in the oil level detection device according to Embodiment 1 of the present invention.

FIG. 7 is a flowchart (with self-heating) for illustrating a flow of the oil level detection of the oil level detection device according to Embodiment 1 of the present invention. Now, the specific flow of the oil level detection is described with reference to FIG. 7.

First, when the determination of the oil level detection is started, the sensor determination unit 35b causes the electric power controlling unit 35d to perform the second electric power control and causes the oil level detection sensor 37 to self-heat (S201). Then, when an arbitrary period of time has elapsed (S202), the sensor determination unit 35b obtains a measurement value T3 of the oil level detection sensor 37 (S203). Next, the sensor determination unit 35b causes the sensor output unit 35f to output a signal to change the compressor suction temperature to the refrigerating and air-conditioning apparatus 1, to thereby change the operation state of the refrigerating and air-conditioning apparatus (S204). Then, the sensor determination unit 35b determines whether or not the refrigeration cycle of the refrigerating and air-conditioning apparatus 1 is stable (S205). After confirming that the refrigeration cycle is stable, the sensor determination unit 35b obtains a measurement value T4 of the oil level detection sensor 37 (S206). After that, the sensor determination unit 35b compares the measurement value T3 obtained in S203 and the measurement value T4 obtained in S206 with each other (S207). When T3=T4, the sensor determination unit 35b determines "oil present (no abnormality)" (S208). When T3≠T4, the sensor determination unit 35b determines "oil depletion" and reports the determination (S209).

In the foregoing, the determination is performed respectively in the case of using the oil level detection sensor 37 without causing the oil level detection sensor 37 to self-heat and the case of using the oil level detection sensor 37 by causing the oil level detection sensor 37 to self-heat. However, the determination may be performed through a combination of both the cases. The flow of the oil level detection in the case of combining both the cases is described below.

Figure 8:
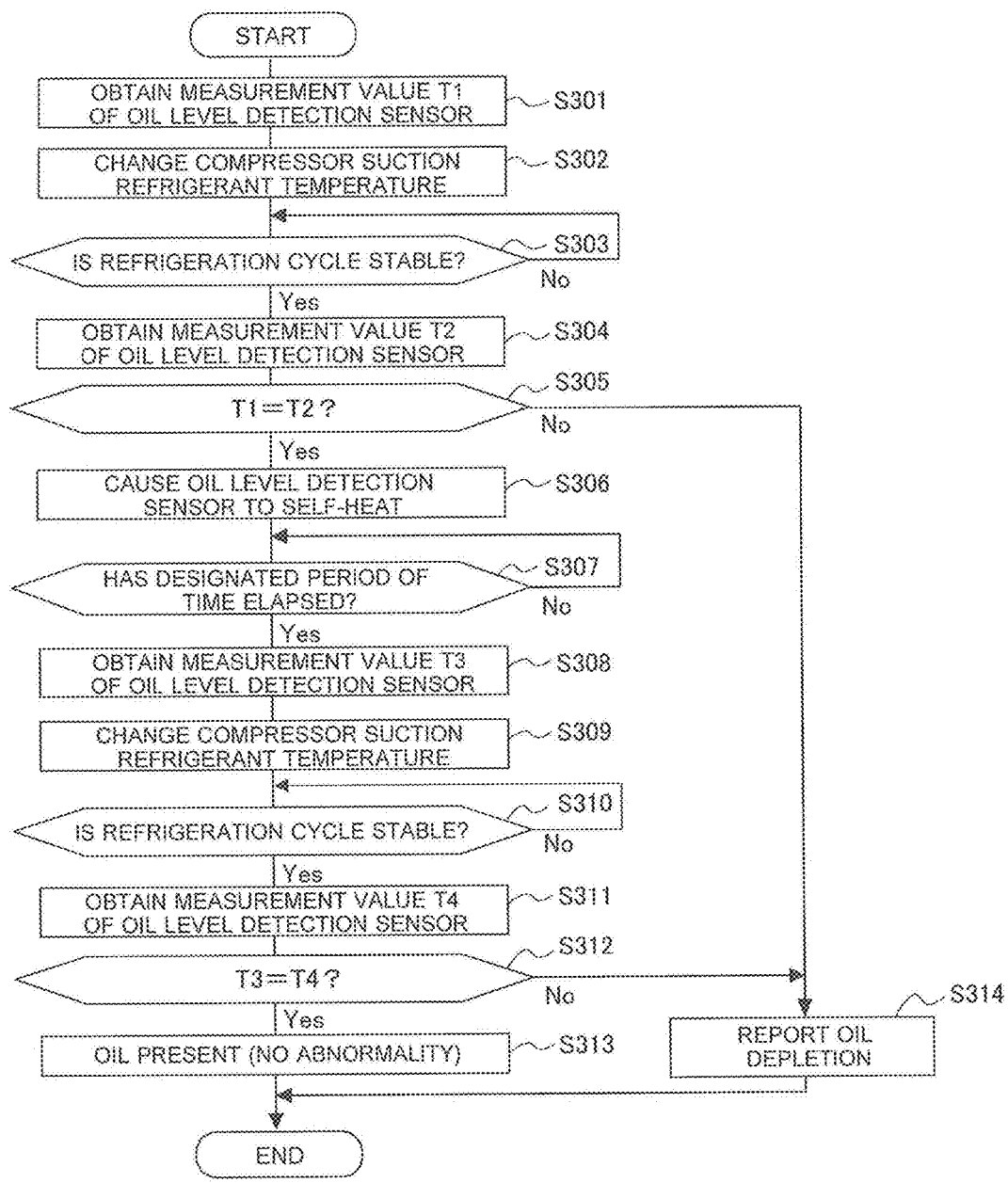
FIG. 8 is a flowchart for illustrating a flow of oil level detection employing a combination of methods for respectively illustrated in FIG. 6 and FIG. 7.

FIG. 8 is a flowchart for illustrating the flow of the oil level detection in the case of combining the methods respectively illustrated in FIG. 6 and FIG. 7. Step S301 to Step S305 are the same as Step S101 to Step S105 of FIG. 6. Further, Step S306 to Step S314 are the same as Step S201 to Step S209 of FIG. 7.

First, when the determination of the oil level detection is started, the sensor determination unit 35b performs the oil level detection through use of the oil level detection sensor 37 without causing the oil level detection sensor 37 to self-heat (S301 to S305). Then, when T1=T2 in the determination of S305, the sensor determination unit 35b performs the oil level detection through use of the oil level detection sensor 37 by causing the oil level detection sensor 37 to self-heat (S306 to S314).

Through the combination of the methods respectively illustrated in FIG. 6 and FIG. 7, erroneous determination can be more reliably prevented.

As described above, according to Embodiment 1, the refrigerating and air-conditioning apparatus 1 is controlled to change the compressor suction temperature, to thereby change only the temperature of the gas refrigerant flowing into the compressor 21. Therefore, oil depletion can be determined by a simple method involving determining oil depletion based on the difference in temperature, and erroneous determination can be prevented.

Note that, FIG. 4 is a diagram for illustrating a configuration adaptable to all the oil level detections according to Embodiment 1 to Embodiment 3, and hence the reference sensor 36 is provided. However, in the oil level detection according to Embodiment 1, the reference sensor 36 is not required and may be omitted.

Embodiment 2

In Embodiment 1, the oil level detection is performed through use of only the oil level detection sensor 37, but in Embodiment 2, the oil level detection is performed through use of both the oil level detection sensor 37 and the reference sensor 36.

(Oil Level Detection Principle)

Hitherto, as the method of detecting an oil level in the oil level detection device 60, there have been known two systems: a temperature detection type (A) and an external heating type (B). Embodiment 2 has a feature of combining the control of the refrigerating and air-conditioning apparatus 1 configured to improve determination accuracy (hereinafter referred to as "determination accuracy improving operation") with each of the related-art temperature detection type and external heating type.

(A) Temperature Detection System

The temperature detection type is a method of detecting an oil level based on a phenomenon in which a difference is caused between the compressor surface temperature of a portion in which the oil is present within the sealed container 21A and the compressor surface temperature of a portion in which the gas refrigerant is present. This phenomenon is influenced by the difference in heat transfer coefficient between the oil and the gas refrigerant, and the difference in heat transfer coefficient between the oil and the gas refrigerant is first described below.

When the heat transfer coefficient in a compressor inner wall is compared between the oil and the gas refrigerant, the heat transfer coefficient of the oil portion is larger than that of the gas portion. That is, the oil has small thermal resistance in the compressor inner wall, compared to the gas refrigerant, and easily transmits heat. Thus, on the compressor surface of the oil portion, the compressor surface temperature approaches an internal temperature (that is, the temperature of the oil), whereas on the compressor surface of the gas portion, the compressor surface temperature approaches an external temperature. Therefore, in the case where the temperature of the oil inside the compressor is the same as that of the gas refrigerant inside the compressor, and there is a temperature difference between the inside and the outside of the compressor, a temperature difference is caused between the compressor surface of the oil portion and the compressor surface of the gas portion. In the temperature detection type, an oil level position is specified based on the temperature difference.

Figure 9:
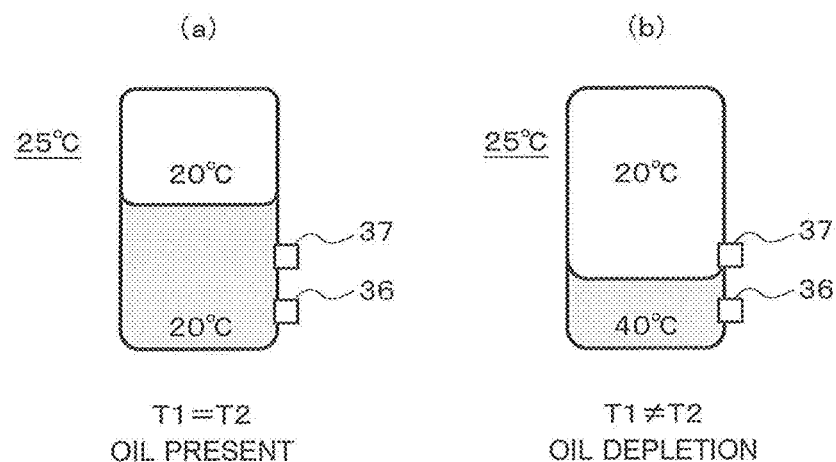
FIG. 9 are views for respectively illustrating two compressor states of a compressor that is a component of a refrigerating and air-conditioning apparatus according to Embodiment 2 of the present invention.

FIG. 9 are views for respectively illustrating two compressor states of a compressor that is a component of a refrigerating and air-conditioning apparatus according to Embodiment 2 of the present invention. FIG. 9(a) is the case where the outside air temperature is 25 degrees C., there is a difference between the internal temperature and the external temperature of the compressor, the oil is present in the proper amount or more inside the compressor, and the temperature of the oil is equal to that of the gas refrigerant, and FIG. 9(b) is the case where the outside air temperature is 25 degrees C., there is a difference between the internal temperature and the external temperature of the compressor, the oil is in a depleted state, and the temperature of the oil is higher than that of the gas portion.

When the oil level detection is performed by the temperature detection type in those cases, the following determination results are obtained. In the following, T1 represents a measurement value of the reference sensor 36, and T2 represents a measurement value of the oil level detection sensor.

(a) T1=T2, and "oil present" is determined.
(b) T1≠T2, and "oil depletion" is determined.

The case where the temperature of the oil inside the compressor is the same as that of the gas refrigerant inside the compressor, and there is a temperature difference between the inside and the outside of the compressor is described above. Next, the case where the temperature of the oil inside the compressor is higher than that of the gas refrigerant inside the compressor is considered. In the case where "there is a difference between the internal temperature and the external temperature of the compressor, and the temperature of the oil is higher than that of the gas refrigerant", a compressor surface temperature difference is further increased compared to the case where "there is a difference between the internal temperature and the external temperature of the compressor, and the temperature of the oil is equal to that of the gas refrigerant". The reason for this is that, in addition to the difference in heat transfer coefficient between the oil portion and the gas portion inside the compressor, the temperature of the oil portion is higher than that of the gas refrigerant, and the compressor surface temperature difference increases by that difference. Thus, in the case where "there is a difference between the internal temperature and the external temperature of the compressor, and the temperature of the oil is higher than that of the gas refrigerant", the presence/absence of the oil can be determined by the temperature detection type without any erroneous detection.

(B) External Heating System

The above-mentioned temperature detection type involves detecting an oil level based on the temperature difference appearing on the compressor surface due to the difference in heat transfer coefficient between the oil and the gas refrigerant within the closed container 21A. The external heating type is also the same as the temperature detection type in that the difference in heat transfer coefficient between the oil and the gas refrigerant within the closed container 21A is used. However, the external heating type involves forcibly applying heat to the container surface to create a temperature situation in which the temperature of the compressor surface is higher than the internal temperature by the applied heat, and comparing the measurement value of the reference sensor 36 and the measurement value of the oil level detection sensor 37 with each other based on the difference in heat transfer characteristics between the oil portion and the gas portion caused by the difference in heat transfer coefficient, to thereby determine whether or not the oil is depleted.

Specifically, when the heat transfer coefficient in the compressor inner wall is compared between the oil and the gas refrigerant as described above, the heat transfer coefficient of the oil portion is larger than that of the gas portion. That is, the oil has small thermal resistance in the compressor inner wall, compared to the gas refrigerant, and the heat applied to the compressor surface is easily transferred to the oil inside the compressor. Consequently, when the compressor is heated externally, the compressor surface temperature of the oil portion is lower than that of the gas portion. The operation state and surrounding environment of the compressor 21 change, and hence in determining whether or not the oil is depleted, the measurement value of the reference sensor 36 installed at the position serving as the oil portion constantly is compared with the measurement value of the oil level detection sensor 37 installed at the height at which the oil amount is desired to be ensured. Then, when the measurement value of the reference sensor 36 is equal to that of the oil level detection sensor 37, it is determined that the oil is present up to the position of the height of the oil level detection sensor 37 and "oil present" is determined. When the measurement value of the reference sensor 36 is different from that of the oil level detection sensor 37, "oil depletion" is determined.

Figure 10:
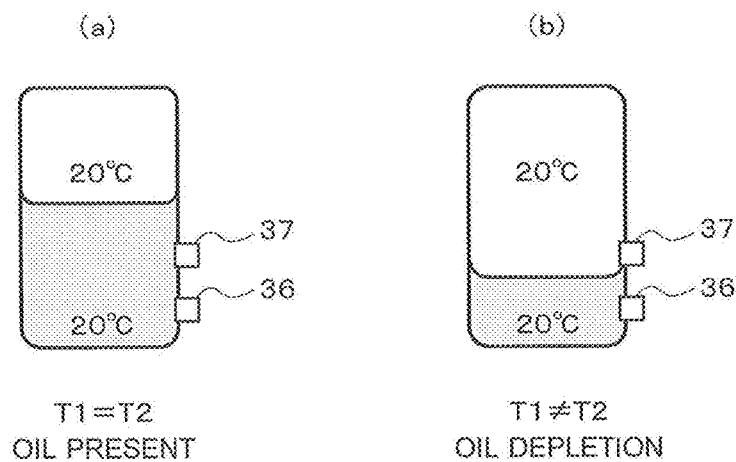
FIG. 10 are views for respectively illustrating two compressor states of the compressor that is the component of the refrigerating and air-conditioning apparatus according to Embodiment 2 of the present invention.

FIG. 10 are views for respectively illustrating two compressor states of the compressor that is the component of the refrigerating and air-conditioning apparatus according to Embodiment 2 of the present invention. FIG. 10(*a*) is the case where the oil is present in the proper amount or more inside the compressor, and the temperature of the oil is equal to that of the gas refrigerant, and FIG. 10(*b*) is the case where the oil is in a depleted state, and the temperature of the oil is equal to that of the gas refrigerant.

When the oil level detection is performed by the external heating system in those cases, the following determination results are obtained.

(a) T1=T2, and "oil present" is determined.
(b) T1≠T2, and "oil depletion" is determined.

(Determination Accuracy Improving Operation)

As described above, in the case where the reference sensor 36 and the oil level detection sensor 37 are installed on the outer surface of the compressor 21, the compressor surface temperature difference between the oil portion and the gas portion is small. Therefore, in order to improve the determination accuracy, the operation condition is changed to vary the compressor suction temperature. A specific method is described below.

(A) Temperature Detection System

In the temperature detection type, the difference in compressor surface temperature between the oil portion and the gas portion is increased by changing the compressor suction temperature based on the relationship between the compressor ambient temperature (outside air temperature) and the oil temperature (≈reference sensor temperature).

In the case where the oil temperature (reference sensor temperature) is lower than the compressor ambient temperature (outside air temperature), the compressor suction temperature is increased so as to further increase the difference. Thus, through the control of the refrigerating and air-conditioning apparatus 1 for the purpose of increasing the compressor suction temperature, the compressor surface temperature of the gas portion is increased, and the temperature difference between the compressor surface temperature of the gas portion and that of the oil portion is increased.

In contrast, in the case where the oil temperature (reference sensor temperature) is higher than the compressor ambient temperature (outside air temperature), the compressor suction temperature is decreased so as to further increase the difference. Thus, through the control of the refrigerating and air-conditioning apparatus 1 for the purpose of decreasing the compressor suction temperature, the compressor surface temperature of the gas portion is decreased, and the temperature difference between the compressor surface temperature of the gas portion and that of the oil portion is increased.

(B) External Heating System

In the external heating type, in order to increase the difference in heat transfer characteristics between the oil portion and the gas portion, it is desired that the refrigerant flowing into the compressor 21 have high temperature to the extent possible. The reason for this is that, when the temperature of the gas refrigerant flowing into the compressor 21 is high, the gas portion is more unlikely to transfer heat, and the difference in heat transfer characteristics between the gas portion and the oil portion that easily transfers heat increases.

As described above, in order to improve the determination accuracy, the operation of increasing or decreasing the compressor suction temperature is performed. The operation of changing the compressor suction temperature is described below.

(Operation for Changing Compressor Suction Temperature)

In order to increase the compressor suction temperature, the refrigerant-side heat exchange amount of the evaporator arranged on an upstream side of the compressor 21 is set to be smaller than the air-side heat exchange amount thereof. With this, the evaporating temperature can be increased, to thereby increase the compressor suction temperature. The following three methods are employed for the operation of increasing the compressor suction temperature as described above.

(1) Evaporator Fan Control

As a measure for changing the compressor suction temperature, the air volume of a fan installed in the evaporator may be controlled. When the air volume of the fan is increased, the air-side heat exchange amount is increased compared to the refrigerant-side heat exchange amount. Therefore, the refrigerant is put into a superheated state at the outlet of the evaporator, and the temperature of the refrigerant can be increased by the superheated amount from the saturation temperature. Further, when the air volume of the fan of the evaporator is increased, heat exchange can be performed even at high evaporating temperature, and hence the evaporating temperature is increased, with the result that the compressor suction temperature can be increased. In contrast, in the case where the air volume of the fan of the evaporator is decreased, the degree of superheat at the outlet of the evaporator is decreased, and the evaporating temperature is decreased, with the result that the compressor suction temperature can be decreased.

(2) Expansion Valve Opening Degree Control

As the second measure for changing the compressor suction temperature, the opening degree of the expansion valve may be controlled. The refrigerant flowing through the evaporator is reduced in amount by lowering the opening degree of the expansion valve. Thus, the refrigerant-side heat exchange amount of the evaporator is decreased compared to the air-side heat exchange amount thereof, and the refrigerant that is in a two-phase state at an inlet of the evaporator is put into a superheated gas state at the outlet of the evaporator. In contrast, the amount of the refrigerant flowing through the evaporator is increased by raising the opening degree of the expansion valve. Thus, the refrigerant-side heat exchange amount of the evaporator is increased compared to the air-side heat exchange amount, and the degree of superheat at the outlet of the evaporator is decreased. Further, in the case where the refrigerant-side heat exchange amount is increased, the refrigerant at the outlet of the evaporator is put into a saturated state.

(3) Compressor Frequency Control

As the third measure for changing the compressor suction temperature, the frequency of the compressor 21 may be controlled. When the compressor frequency is decreased, the amount of the refrigerant flowing through the evaporator is decreased, and the refrigerant-side heat exchange amount of the evaporator is decreased compared to the air-side heat exchange amount thereof. Thus, the evaporating temperature is increased, with the result that the compressor suction temperature can be increased. In contrast, when the compressor frequency is increased, the heat exchange amount is balanced, and hence the evaporating temperature is decreased, with the result that the compressor suction temperature can be decreased.

Figure 11:
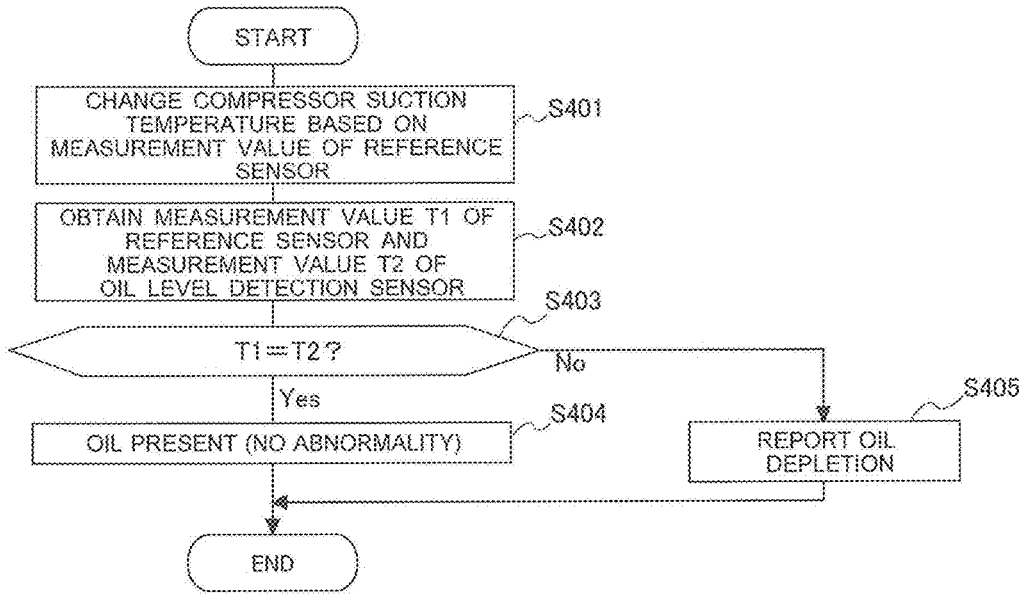
FIG. 11 is a flowchart for illustrating a flow of oil level detection in a temperature detection type of an oil level detection device according to Embodiment 2 of the present invention.

FIG. 11 is a flowchart for illustrating a flow of the oil level detection in the temperature detection type of the oil level detection device according to Embodiment 2 of the present invention. Now, the specific flow of the oil level detection in the temperature detection type is described with reference to FIG. 11.

First, when the determination of oil level detection is started, the sensor determination unit 35b performs the above-mentioned determination accuracy improving operation. That is, the sensor determination unit 35b causes the sensor output unit 35f to output a signal to change the compressor suction temperature to the refrigerating and air-conditioning apparatus 1 based on the measurement value of the reference sensor 36 as described above (S401). Then, the sensor determination unit 35b causes the electric power controlling unit 35d to perform the first electric power control and obtains the measurement value T1 of the reference sensor 36 and the measurement value T2 of the oil level detection sensor 37 (S402). Then, the sensor determination unit 35b compares T1 and T2 with each other (S403). When T1=T2, the sensor determination unit 35b determines "oil present (no abnormality)" (S404). When T1≠T2, the sensor determination unit 35b determines "oil depletion" and reports the determination (S405).

Figure 12:
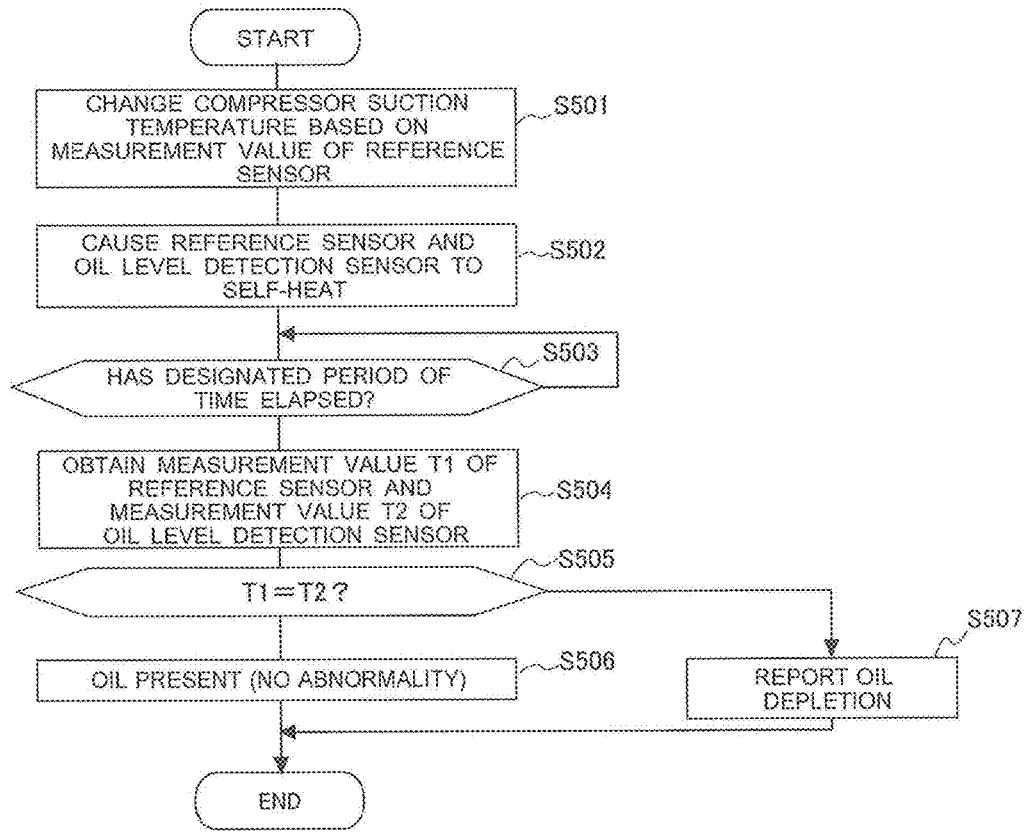
FIG. 12 is a flowchart for illustrating a flow of oil level detection in an external heating type of the oil level detection device according to Embodiment 2 of the present invention.

A flow of the specific oil level detection in the external heating type is described below with reference to FIG. 12.

The sensor determination unit 35b first performs the above-mentioned determination accuracy improving operation. Specifically, the sensor determination unit 35b causes the sensor output unit 35f to output a signal to change the compressor suction temperature to the refrigerating and air-conditioning apparatus 1 based on the measurement value of the reference sensor 36 (S501). Then, the sensor determination unit 35b causes the electric power controlling unit 35d to perform the second electric power control to cause the reference sensor 36 and the oil level detection sensor 37 to self-heat (S502). Then, the sensor determination unit 35b determines whether or not an arbitrary period of time for stabilizing the measurement value has elapsed (S503). When confirming that the arbitrary period of time has elapsed and the measurement value becomes stable, the sensor determination unit 35b obtains the measurement value T1 of the reference sensor 36 and the measurement value of the oil level detection sensor 37 (S504). Then, the sensor determination unit 35b compares T1 and T2 with each other (S505). When T1=T2, the sensor determination unit 35b determines "oil present (no abnormality)" (S506). When T1≠T2, the sensor determination unit 35b determines "oil depletion" and reports the determination (S507).

As described above, according to Embodiment 2, after performing the determination accuracy improving operation, the oil level detection is performed through use of the temperature detection type or the external heating type, and hence erroneous determination can be prevented.

Embodiment 3

In Embodiment 2, the method involving performing the oil level detection by the temperature detection type or the external heating type through use of both the reference sensor 36 and the oil level detection sensor 37 is described. In Embodiment 2, there is no erroneous determination in which "oil depletion" is determined in spite of the fact that the oil is actually present, but in the case where "oil present (no abnormality)" is determined, the oil may be actually depleted in some cases. That is, there is a risk in that oil depletion may be overlooked. In Embodiment 3, through the oil level detection using a combination of the temperature detection type and the external heating type, the risk of overlooking oil depletion is eliminated, and the determination accuracy is improved by performing the above-mentioned determination accuracy improving operation.

Now, the temperature condition under which oil depletion is overlooked in the temperature detection type and the temperature condition under which oil depletion is overlooked in the external heating type are described.

First, as the temperature condition under which there is a risk in that oil depletion may be overlooked in the temperature detection type, there are the case where the temperature difference between the inside and the outside of the compressor 21 is small (for example, ±0.5 to 1 degrees C.), the case where the temperature of the oil is lower than that of the gas refrigerant, and the like.

When the temperature detection is performed under such condition, the difference in compressor surface temperature between the oil portion and the gas portion decreases. Thus, even when the installation portion of the oil level detection sensor is in a gas state, the measurement value of the oil level detection sensor 37 becomes approximate to that of the reference sensor 36, and thus "oil present" may be determined in spite of the fact that the oil is depleted.

Figure 13:
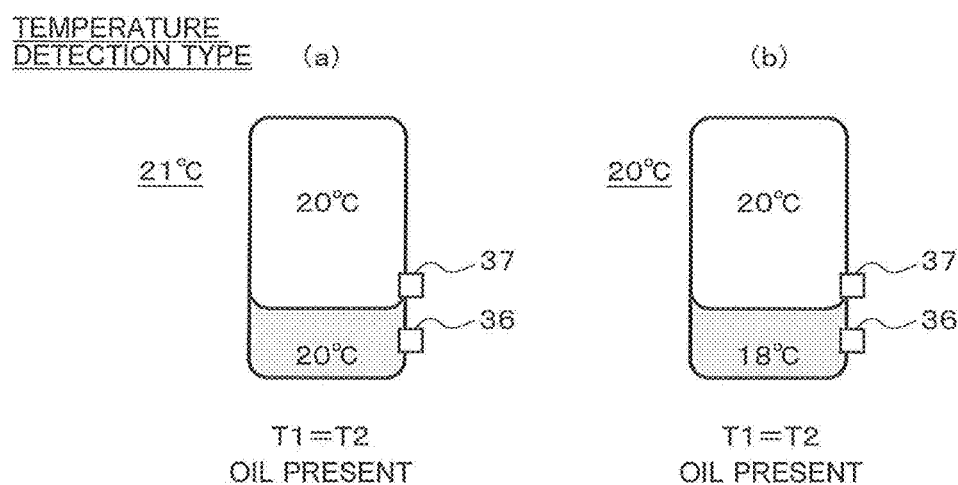
FIG. 13 are each an explanatory view of a temperature detection type of an oil level detection device according to Embodiment 3 of the present invention under a temperature condition in which there is a risk in that oil depletion may be overlooked.

FIG. 13 are each an explanatory view of the temperature detection type of the oil level detection device according to Embodiment 3 of the present invention under the temperature condition in which there is a risk in that oil depletion may be overlooked. FIG. 13(a) is the case where the difference between the internal temperature and the external temperature of the compressor is small, and the temperature of the oil and that of the gas refrigerant are both 20 degrees C., and FIG. 13(b) is the case where the temperature of the oil is lower than that of the gas refrigerant.

When the oil level detection is performed by the temperature detection type in those cases, the following determination result is obtained in both the cases.

T1=T2, and "oil present" is determined in spite of "oil depletion".

That is, the point here is as follows. In the temperature detection type, the result of T1=T2 is obtained in both the case where the temperature of the oil and that of the gas are the same inside the compressor and the difference between the internal temperature and the external temperature of the compressor is small (including the case where there is no difference) and the case where the temperature of the oil is lower than that of the gas refrigerant, and hence there is a risk in that oil depletion may be overlooked. In other words, even when the result of T1=T2 is obtained in the temperature detection type, there is a possibility that the result may include the state of oil depletion.

Next, the temperature condition under which there is a risk in that oil depletion may be overlooked in the external heating type is described. As the temperature condition under which there is a risk in that oil depletion may be overlooked in the external heating type, there is the case where the temperature of the oil is higher than that of the gas refrigerant.

When an oil level is determined by the external heating type under such condition, the difference in compressor surface temperature between the oil portion and the gas portion decreases. Thus, even when the installation portion of the oil level detection sensor is in a gas state, the compressor surface temperature of the oil portion becomes approximate to that of the reference sensor 36, and thus "oil present" may be determined in spite of the fact that the oil is depleted.

Figure 14:
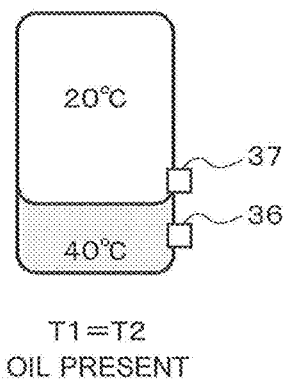
FIG. 14 is an explanatory view of an external heating type of the oil level detection device according to Embodiment 3 of the present invention under a temperature condition in which there is a risk in that oil depletion may be overlooked in spite of the fact that oil is depleted.

FIG. 14 is an explanatory view of an external heating type of the oil level detection device according to Embodiment 3 of the present invention under a temperature condition in which there is a risk in that oil depletion may be overlooked in spite of the fact that the oil is depleted.

The case where the temperature of the oil is higher than that of the gas refrigerant is illustrated. In this case, the following determination result is obtained.

T1=T2, and "oil present" is determined in spite of "oil depletion".

The reason for the foregoing is that, due to the high oil temperature, the measurement value of the reference sensor 36 becomes equal to the compressor surface temperature of the gas portion that is externally heated. That is, the point here is as follows. In the case where the temperature of the oil is higher than that of the gas refrigerant, there is a risk in that oil depletion may be overlooked in the external heating type.

In summary, as described above, when the result of T1=T2 is obtained in the temperature detection type, there is a possibility of overlooking the oil depletion. Therefore, when the result of T1=T2 is obtained in the temperature detection type, determination is not performed only by the temperature detection type and is shifted to the external heating type.

In this case, when the temperature state of the compressor 21 at time of shift to the external heating type is matched with the temperature condition under which there is a risk in that oil depletion may be overlooked in the external heating type, there is a risk in that oil depletion may be similarly overlooked even when the system is shifted to the external heating type. However, the temperature condition under which there is a risk in that oil depletion may be overlooked in the external heating type is the case where the temperature of the oil is higher than that of the gas refrigerant as described above, and this temperature condition is not included in the temperature condition under which there is a risk in that oil depletion may be overlooked in the temperature detection type. That is, when the determination is performed by the temperature detection type, and the system is shifted to the external heating type, the temperature condition under which there is a risk in that oil depletion may be overlooked in the external heating type is eliminated. Therefore, through use of the external heating type following the temperature detection type, overlooking of oil depletion can be prevented. An example is described through use of three compressor states of FIG. 15.

Figure 15:
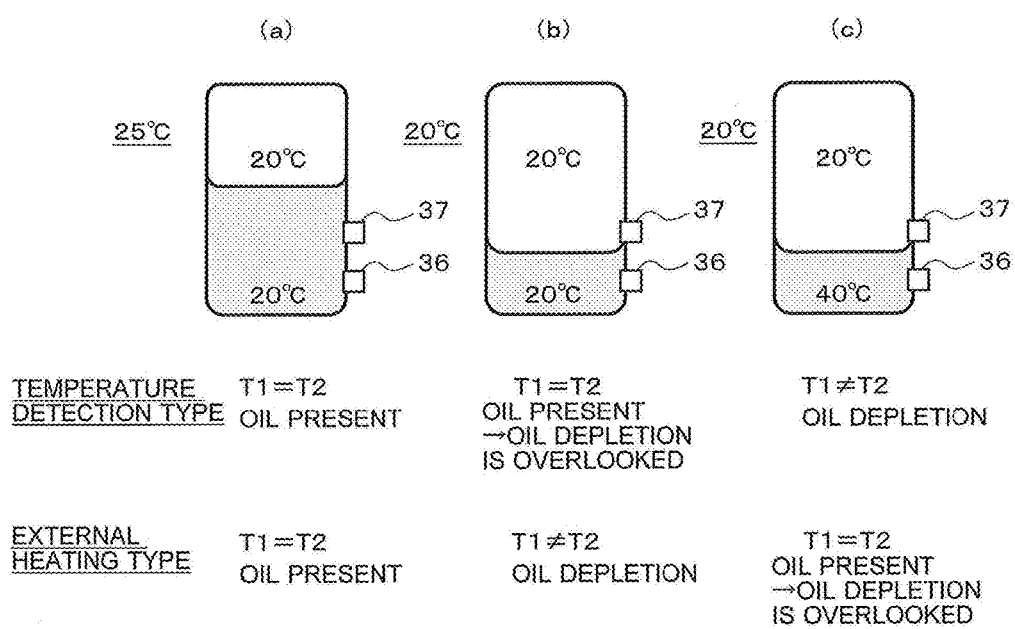
FIG. 15 are schematic views for respectively illustrating three states of a compressor that is a component of a refrigerating and air-conditioning apparatus according to Embodiment 3 of the present invention.

FIG. 15 are schematic views for respectively illustrating three states of a compressor that is a component of the refrigerating and air-conditioning apparatus according to Embodiment 3 of the present invention. FIG. 15(a) is the case where there is a difference between the internal temperature and the external temperature of the compressor, the oil is present in the proper amount or more inside the compressor, and the temperature of the oil is equal to that of the gas refrigerant. FIG. 15(b) is the case where the difference between the internal temperature and the external temperature of the compressor is small, the oil is in a depleted state, and the temperature of the oil is equal to that of the gas refrigerant. FIG. 15(c) is the case where the oil is in a depleted state, and the temperature of the oil is in a state higher than that of the gas portion.

When the oil level detection is performed by the temperature detection type in those cases, the following determination results are obtained.

(a) T1=T2, and "oil present" is determined.

(b) T1=T2, and "oil present" is determined in spite of "oil depletion".

(c) T1≠T2, and "oil depletion" is determined.

In the case of (c), determination is made by the temperature detection type, and "oil depletion" is determined. Meanwhile, in each of (a) and (b) in which T1=T2, determination is subsequently made by the external heating type. In this case, the following determination results are obtained respectively. Note that, for reference, the determination result of the case (c) is also illustrated in FIG. 15.

(a) T1=T2, and "oil present" is determined.

(b) T1≠T2, and "oil depletion" is determined.

As described above, through the combination of the temperature detection type and the external heating type, correct determination can be made by a simple method without overlooking oil depletion.

Figure 16:
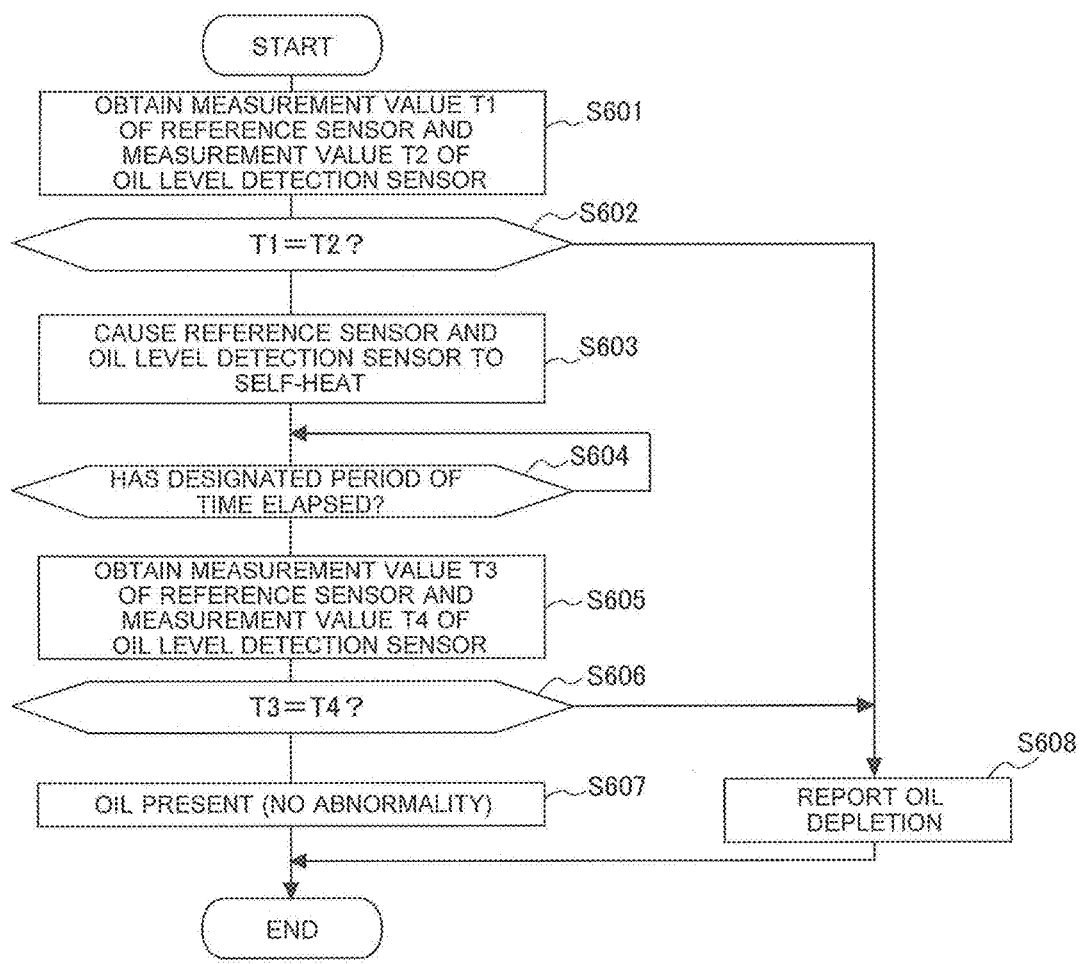
FIG. 16 is a flowchart for illustrating a flow of oil level detection in the oil level detection device according to Embodiment 3 of the present invention.

FIG. 16 is a flowchart for illustrating a flow of the oil level detection of the oil level detection device according to Embodiment 3 of the present invention. Now, the flow of the oil level detection of Embodiment 3 is described with reference to FIG. 16.

First, when the determination of the oil level detection is started, the sensor determination unit 35b causes the electric power controlling unit 35d to perform the first electric power control to obtain the measurement value T1 of the reference sensor 36 and the measurement value T2 of the oil level detection sensor 37 (S601). The sensor determination unit 35b compares T1 and T2 with each other (S602). When T1≠T2, the sensor determination unit 35b determines "oil depletion" and reports the determination (S608). When T1=T2, the sensor determination unit 35b causes the electric power controlling unit 35d to perform the second electric power control and causes the reference sensor 36 and the oil level detection sensor 37 to self-heat (S603).

Then, the sensor determination unit 35b determines whether or not an arbitrary period of time for stabilizing the measurement value has elapsed (S604). When confirming that the arbitrary period of time has elapsed and the measurement value becomes stable, the sensor determination unit 35b obtains the measurement value T3 of the reference sensor 36 and the measurement value T4 of the oil level detection sensor 37 (S605). Then, the sensor determination unit 35b compares T3 and T4 with each other (S606). When T3=T4, the sensor determination unit 35b determines "oil present" (no abnormality)" (S607). When T3≠T4, the sensor determination unit 35b determines "oil depletion" and reports the determination (S608).

Note that, in the flowchart of FIG. 16, the control of changing the compressor suction temperature is not described, but the above-mentioned determination accuracy improving operation is performed in accordance with the measurement value of the reference sensor 36 in order to improve the determination accuracy in each of the temperature detection type and the external heating type.

As described above, according to Embodiment 3, the oil level detection is performed through the combination of the temperature detection type and the external heating type, and the determination accuracy improving operation is performed. Therefore, oil depletion is not overlooked, and erroneous determination can be prevented.

Embodiment 4

In Embodiment 1 to Embodiment 3, the oil level detection device 60 is arranged on the outer surface of the compressor 21. However, in Embodiment 4, the oil level detection device 60 is arranged inside the compressor 21.

Figure 17:
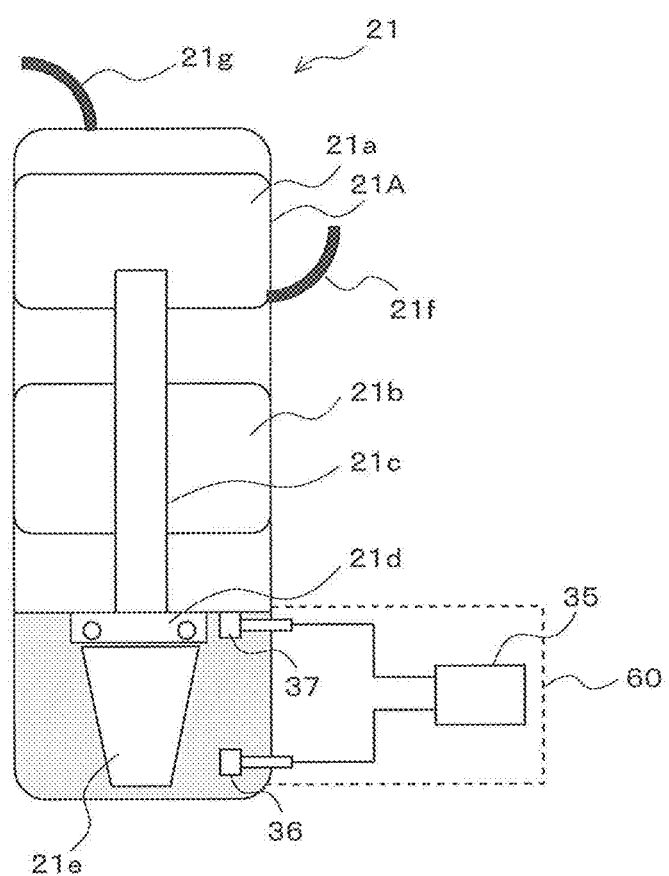
FIG. 17 is a view for illustrating an arrangement position of an oil level detection device in a refrigerating and air-conditioning apparatus according to Embodiment 4 of the present invention.

FIG. 17 is a view for illustrating an arrangement position of an oil level detection device in a refrigerating and air-conditioning apparatus according to Embodiment 4 of the present invention.

As illustrated in FIG. 17, the reference sensor 36 and the oil level detection sensor 37 of the oil level detection device 60 are arranged inside the compressor 21. The other configurations and controls of the refrigerating and air-conditioning apparatus are the same as those of Embodiment 1 to Embodiment 3.

As described above, according to Embodiment 4, the oil level detection device 60 may be arranged inside the compressor 21, and also in this case, the same effects as those of Embodiment 1 to Embodiment 3 can be obtained.

Note that, a local controller serving as a management device, which manages each constituent device to obtain measurement values and operation data through communication to/from outside, such as a telephone line, a LAN, or a radio wave, may be extended to the oil level detection device 60 and the refrigerating and air-conditioning apparatus 1 according to Embodiment 1 to Embodiment 4. Then, the local controller may be extended through a network to a remote server of an information management center that receives the measurement values and the operation data of the oil level detection device 60 and the refrigerating and air-conditioning apparatus 1 according to Embodiment 1 to Embodiment 3, and a storage device such as a disk device configured to accumulate the operation state amount may be extended to the remote server, to thereby configure an oil depletion determination system.

For example, a configuration is conceivable in which the local controller serves as the measurement unit (the sensor measurement unit 35a, the measurement unit 3a) configured to obtain the operation state amount of the refrigerating and air-conditioning apparatus 1 according to Embodiment 1 to Embodiment 4, the storage device serves as the storage unit (the sensor storage unit 35c, the storage unit 3c), and the remote server serves as the determination unit (the sensor determination unit 35b), and the like.

Through the configuration of the system capable of performing remote monitoring, it becomes unnecessary for an operator to visit the actual place to check the excess and deficiency of the amount of the refrigerant at time of periodic maintenance. Therefore, the reliability and operability of the device are further improved.

The features of the present invention are described above separately in the embodiments, but the specific configuration is not limited to those embodiments and may be modified within the range not deviating from the spirit of the present invention. For example, in the embodiments, the case where the present invention is applied to the refrigerating and air-conditioning apparatus 1 dedicated to cooling is described as an example. However, the present invention is not limited thereto, and may be applied to a refrigerating and air-conditioning apparatus capable of switching between cooling and heating or a refrigerating and air-conditioning apparatus dedicated to heating. Further, in the embodiments, the refrigerating and air-conditioning apparatus including one outdoor unit 2 is described as an example. However, the present invention is not limited thereto, and may be applied to the refrigerating and air-conditioning apparatus including a plurality of outdoor units 2. Further, features of each embodiment may be appropriately combined in accordance with the application and purposes.

The invention claimed is:

1. An oil level detection device to be mounted on a refrigerating and air-conditioning apparatus, the oil level detection device being configured to detect an oil level of oil accumulated inside a compressor of the refrigerating and air-conditioning apparatus, the oil level detection device comprising:
   an output unit configured to output, to the refrigerating and air-conditioning apparatus, a signal to change a compressor suction temperature of refrigerant to be sucked into the compressor, and
   a) an oil level detection sensor installed at a position at a predetermined height of the compressor and configured to detect a temperature of the position of installation of the oil level detection device;
   a determination unit configured to determine whether there is depletion of the oil accumulated inside the compressor by comparing a measurement value obtained by the oil level detection sensor before an output of the signal from the output unit, with a measurement value obtained by the oil level detection sensor after the output of the signal from the output unit,
   wherein the oil level detection device further comprises an electric power controlling unit configured to perform first electric power control of supplying first electric power, which does not cause the oil level detection sensor to self-heat, to the oil level detection sensor, and second electric power control of supplying second electric power, which causes the oil level detection sensor to self-heat, to the oil level detection sensor,
   wherein the determination unit is configured to
   cause the electric power controlling unit to perform the first electric power control, cause the output unit to output the signal to change the compressor suction temperature, compare a measurement value obtained by the oil level detection sensor before an output of the signal from the output unit, with a measurement value obtained by the oil level detection sensor after the output of the signal from the output unit, and determine that there is the depletion of the oil in a case where the two measurement values are different; and
   cause the electric power controlling unit to perform the second electric power control in a case where the two measurement values are same, cause the output unit to output the signal to change the compressor suction temperature, compare the measurement value obtained by the oil level detection sensor before the output of the signal from the output unit, with the measurement value obtained by the oil level detection sensor after the output of the signal from the output unit, and determine that there is the depletion of the oil in a case where the two measurement values are different; or
   b) a reference sensor installed at a position at a height of the compressor at which the compressor is filled with the oil and configured to detect a temperature of a position of installation of the reference sensor,
   an oil level detection sensor installed at a position at a predetermined height of the compressor and configured to detect a temperature of the position of installation of the oil level detection sensor;
   a determination unit configured to determine whether there is depletion of the oil accumulated inside the compressor by comparing a measurement value of the oil level detection sensor after an output of the signal from the output unit with a measurement value of the oil level detection sensor;
   wherein the oil level detection device further comprises,
   an electric power controlling unit configured to perform first electric power control of supplying first electric power, which does not cause the reference sensor and the oil level detection sensor to self-heat, to the reference sensor and the oil level detection sensor,
   wherein the determination unit is configured to use, in determining oil depletion, the two measurement values obtained by causing the electric power controlling unit to perform the first electric power control,
   wherein the electric power controlling unit is further configured to perform second electric power control of supplying second electric power, which causes the reference sensor and the oil level detection sensor to self-heat, to the reference sensor and the oil level detection sensor, and
   wherein, in a case where the two measurement values are same, the determination unit is configured to determine whether there is the depletion of the oil by comparing a measurement value of the reference sensor with a measurement value of the oil level detection sensor, which are obtained by causing the electric power controlling unit to perform the second electric power control.

2. The oil level detection device of claim 1, wherein the determination unit is configured to determine that oil to be accumulated inside the compressor is depleted in a case where the two measurement values are different.

3. The oil level detection device of claim 1, wherein, in a case where the measurement value of the reference sensor is lower than a compressor ambient temperature, the output unit is configured to output a signal for increasing the compressor suction temperature to the refrigerating and air-conditioning apparatus.

4. The oil level detection device of claim 1, wherein, in a case where the measurement value of the reference sensor is higher than a compressor ambient temperature, the output unit is configured to output a signal for decreasing the compressor suction temperature to the refrigerating and air-conditioning apparatus.

5. The oil level detection device of claim 1,
   wherein, in determining oil depletion, the determination unit is configured to use the two measurement values obtained by causing the electric power controlling unit to perform the second electric power control, and
   wherein, in the second electric power control, the output unit is configured to output a signal for increasing the compressor suction temperature to the refrigerating and air-conditioning apparatus.

6. The oil level detection device of claim 5, wherein the oil level detection sensor is installed at a position at a height of the compressor at which an oil amount needs to be ensured inside the compressor.

7. The oil level detection device of claim 6, wherein the output unit is configured to change the compressor suction temperature by changing a fan air volume of an evaporator of the refrigerating and air-conditioning apparatus.

8. The oil level detection device of claim 7, wherein the output unit is configured to change the compressor suction temperature by changing an opening degree of an expansion valve of the refrigerating and air-conditioning apparatus.

9. The oil level detection device of claim 8, wherein the output unit is configured to change the compressor suction temperature by changing a frequency of the compressor.

10. The oil level detection device of claim 9, wherein the output unit is configured to report a result of determination of the determination unit.

11. A refrigerating and air-conditioning apparatus having the oil level detection device of claim 10.

\* \* \* \* \*